United States Patent [19]

Sugishima et al.

[11] Patent Number: 5,181,104
[45] Date of Patent: Jan. 19, 1993

[54] IMAGE PROCESSING APPARATUS HAVING A READER MOVABLE TO A DESIGNATED POSITION

[75] Inventors: Kiyohisa Sugishima, Yokohama; Masahiro Nishio, Tokyo, both of Japan

[73] Assignee: Canon Kabushiki Kaisha, Tokyo, Japan

[21] Appl. No.: 733,976

[22] Filed: Jul. 22, 1991

Related U.S. Application Data

[63] Continuation of Ser. No. 353,710, May 18, 1989, abandoned.

[30] Foreign Application Priority Data

May 20, 1988 [JP] Japan ................................. 63-123681
Oct. 11, 1988 [JP] Japan ................................. 63-256328
Oct. 11, 1988 [JP] Japan ................................. 63-256331

[51] Int. Cl.$^5$ ............................................. H04N 1/04
[52] U.S. Cl. ................................. 358/75; 358/414; 358/453
[58] Field of Search ............... 358/474, 486, 491, 494, 358/497, 75, 400, 453

[56] References Cited

U.S. PATENT DOCUMENTS

| 4,771,333 | 9/1988 | Michaels | 358/497 |
| 4,771,336 | 9/1988 | Ohtorii | 358/497 |
| 4,847,689 | 7/1989 | Yamamoto et al. | 358/75 |
| 4,873,570 | 10/1989 | Suzuki et al. | 358/80 |
| 4,876,612 | 8/1989 | Honma et al. | 358/474 |
| 4,918,542 | 4/1990 | Nagashima et al. | 358/451 |
| 4,954,913 | 9/1990 | Kajita | 358/474 |

FOREIGN PATENT DOCUMENTS 0038070 10/1981 European Pat. Off.
59117858 7/1984 Japan ................................. 358/453
0239175 11/1985 Japan .

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image processing apparatus includes a CCD unit having a linear image sensor, for reading an image line by line and generating image data, a first moving unit including a motor and rails for repeatedly moving a reading position of the CCD unit in a main scanning direction a plurality of times, a second moving unit including a motor and rails for moving the reading position of the CCD unit in a sub scanning direction every time the reading position of the CCD unit is moved in the main scanning direction, and a control unit for controlling the first and second moving units to shift the reading position of the CCD unit to a desired position, and mirrors for causing an operator to recognize coordinates of the reading position of the CCD unit which is shifted to the desired position by the control unit. The control unit shifts the reading position of the CCD unit to the desired position by using a plurality of moving speeds.

26 Claims, 24 Drawing Sheets

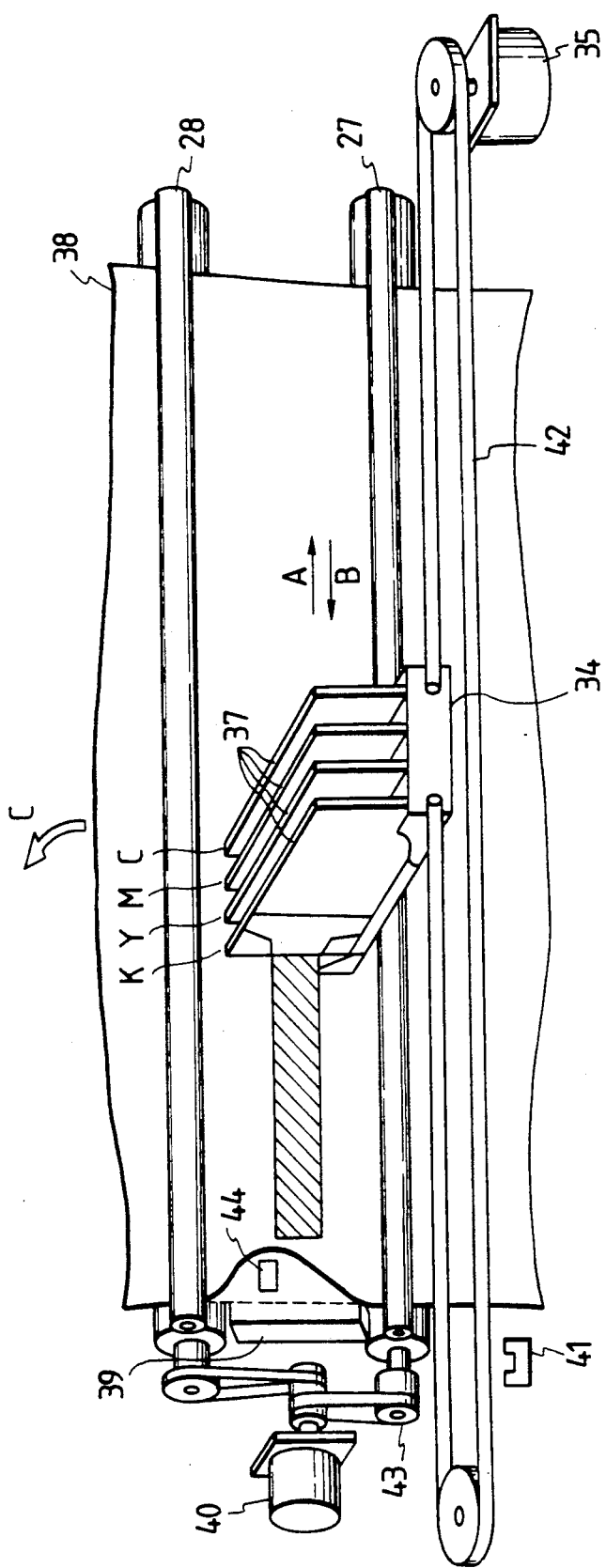

|  |  |  |
|---|---|---|
| -1 | -1 | -1 |
| -1 | 8 | -1 |
| -1 | -1 | -1 |

| # | # | # | # |
|---|---|---|---|
| # | * | # | # |
| # | # | # | # |
| # | # | # | # |

BLOCK A

| # | # | # | # |
|---|---|---|---|
| # | # | # | # |
| # | # | * | # |
| # | # | # | # |

BLOCK B

\# : PIXEL FOR DECREASE OF DENSITY
\* : PIXEL FOR CONCENTRATION OF DENSITY

IMAGE PROCESSING APPARATUS HAVING A READER MOVABLE TO A DESIGNATED POSITION

This application is a continuation of application Ser. No. 353,710, filed May 18, 1989, now abandoned.

BACKGROUND OF THE INVENTION

I. Field of the Invention

The present invention relates to an image processing apparatus and, more particularly, to an apparatus for converting an image of interest into an image signal.

II. Description of the Related Art

Most of the conventional copying machines have employed a system exemplified by an electrophotographic copying machine for directly projecting an optical image obtained by optically reading an original onto a photosensitive body and developing a latent image corresponding to the optical image to form a visual image.

In recent years, a copying machine has been proposed wherein information obtained with reading an original by an image reader unit is converted into an electrical signal, the electrical signal is sent to an image output unit, and an image is formed on a recording medium on the basis of image information sent to the image output unit.

The copying machine described above can be arranged by connecting the image reader unit (to be referred to as a scanner hereinafter) and the image output unit (to be referred to as a printer hereinafter) via signal lines. Therefore, even if the scanner and the printer are located at remote positions, the copying machine can be properly operated. In addition, this copying machine has advantages in that image processing such as trimming, synthesis, and variable magnification of the image can be arbitrarily performed as compared with the conventional copying machine since the image information of the original is converted into the electrical signal.

In particular, a color copying machine proposes various advanced functions associated with color information, such as color conversion.

There is also known a copying machine comprising a one-dimensional image sensor for reading images of a plurality of pixels in a first direction and a recording head for recording the images of the plurality of pixels in the first direction on the basis of image data provided from the image sensor, wherein a read position of the image sensor and a recording position of the recording head are moved in a main scanning direction perpendicular to the first direction, and the read position of the image sensor and the recording position of the recording head are moved in a sub scanning direction parallel to the first direction, thereby copying a large-sized original image.

In the conventional copying machine and the conventional original reading apparatus of this type, various types of coordinate designation mechanisms have been proposed to designate positions on an original so as to perform area processing such as trimming.

However, since a coordinate designation mechanism and an original reading mechanism are different from each other, coordinate designation is performed and then an original is placed on the reading mechanism. Therefore, it is very difficult to accurately position the original on the reading mechanism with respect to coordinate designation. In view of this, another function for detecting the position of the original is also required.

In the conventional copying machines and the conventional image reading apparatuses, various types of apparatuses or mechanisms for designating an original size have been proposed. Information of the size of an original placed on an original table is obtained by one scanning cycle of the original. However, the following disadvantages are presented:

(1) A scanning operation for measuring only an original size is required and results in inefficiency.

(2) Accurate original size information cannot be obtained depending on the quality of an original.

(3) A means for determining an original size is required.

An apparatus capable of processing a color image has functions for adjusting color balance of an original and changing a hue of an original.

In this apparatus, however, if information of a color subjected to color conversion cannot be accurately detected during conversion such as color conversion by utilizing the above functions, these functions cannot be effectively utilized.

For example, when a color to be converted is blue, blue cannot be quantitatively designated.

SUMMARY OF THE INVENTION

The present invention has been made in consideration of the above situation, and has as an object to provide an image processing apparatus capable of effectively and accurately performing coordinate designation of an image to be processed.

It is another object of the present invention to provide an image processing apparatus capable of effectively and easily designating the size of an image to be processed.

It is still another object of the present invention to provide an image processing apparatus capable of easily detecting a state of an image to be processed.

It is still another object of the present invention to provide an image processing apparatus suitable for processing a large-sized original image.

It is still another object of the present invention to provide an image processing apparatus suitable for processing a color image.

It is still another object of the present invention to provide an image processing apparatus capable of easily inputting coordinate data, size data, and the like which are required for image processing.

The above and other objects, features, and advantages of the present invention will be apparent from the following detailed description in conjunction with the accompanying drawings.

BRIEF DESCRIPTION OF THE DRAWINGS

FIG. 3 is a detailed view showing a structure around a scanning carriage;

DETAILED DESCRIPTION OF THE PREFERRED EMBODIMENT

Figure 1:
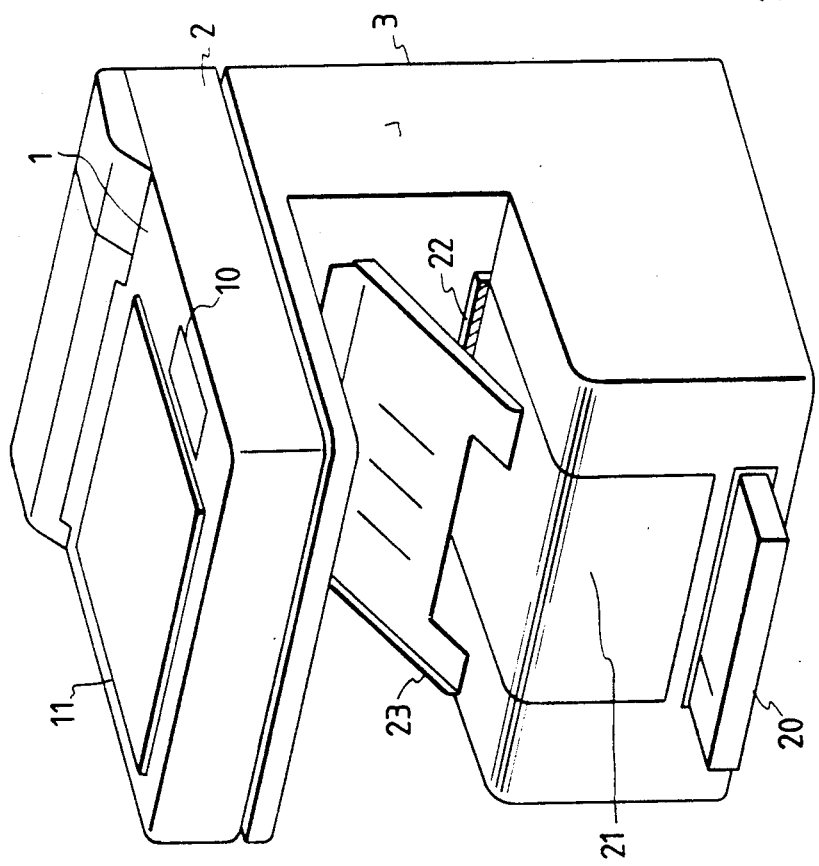
FIG. 1 is a perspective view of a digital color copying machine according to an embodiment of the present invention.

FIG. 1 is a perspective view showing a digital color copying machine according to an embodiment of the present invention.

The digital color copying machine is divided into two parts.

The upper part in FIG. 1 comprises a color image scanner section 1 (to be referred to as a scanner section 1 hereinafter) for reading an original image and outputting digital color image data, and a control section 2, incorporated in the scanner section 1, for performing various image processing operations of the digital color image data and interfacing with an external device.

The scanner section 1 reads an image on a stereoscopic or sheet original which is placed such that an image surface faces down. The original is held by an original holder 11. The scanner section 1 also includes a mechanism for reading a large-sized sheet original.

An operation unit 10 is connected to the control section 2 to input various data for the copying machine. The control section 2 sends an instruction signal to the scanner section 1 and a printer section 3 in accordance with the input data.

Figure 4:
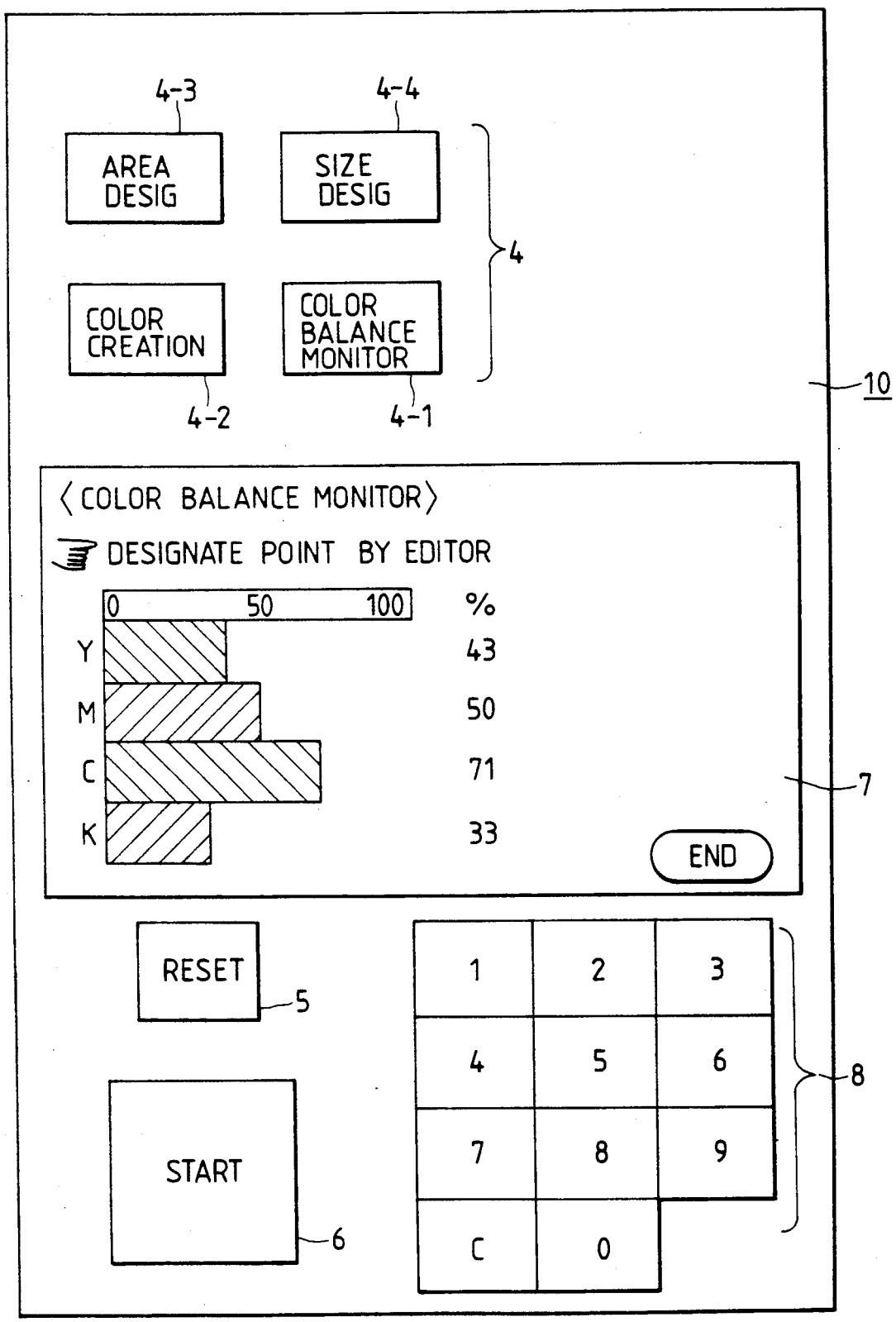
FIG. 4 is a view showing an operation unit 10.

FIG. 4 shows the operation unit 10.

Referring to FIG. 4, a liquid crystal display 7 can display various pieces of information. The liquid crystal display 7 is covered with a transparent touch panel, and various data can also be entered. The liquid crystal display 7 is referred to as a touch panel display 7 hereinafter. The operation unit 10 also includes a ten-key pad 8 for entering various numeric values in accordance with various designated functions, and function keys 4 for designating an area, a zoom memory, and color conversion. When each key 4-1, 4-2, 4-3 or 4-4 is depressed, the touch panel display 7 displays the corresponding content. The operation unit 10 further includes a reset key 5 for resetting a set mode or interrupting a copying operation, and a start key 6 for designating the start of copying.

FIG. 4 shows a state wherein a color balance monitor mode set by the key 4-1 is displayed. When a given point of the original is designated by an editor (to be described later) serving as a coordinate input means, a color balance monitor reads color data of the designated point and displays a bar graph with accurate percents of output color data, i.e., yellow (Y), magenta (M), cyan (C), and black (K) data.

When complicated editing processing is required, a digitizer or the like may be attached in place of the original holder 11 and connected to the control section 2, thereby performing advanced processing.

The lower part in FIG. 1 comprises the printer section 3 for recording a color image on a recording sheet on the basis of the color digital image signal output from the control section 2. In this embodiment, the printer section 3 comprises an ink-jet printer having a recording head of an ink-jet recording scheme described in Japanese Patent Laid-Open (Kokai) No. 54-59936.

The upper and lower parts of the digital color copying machine can be separated from each other and can be installed at remote positions.

Figure 2:
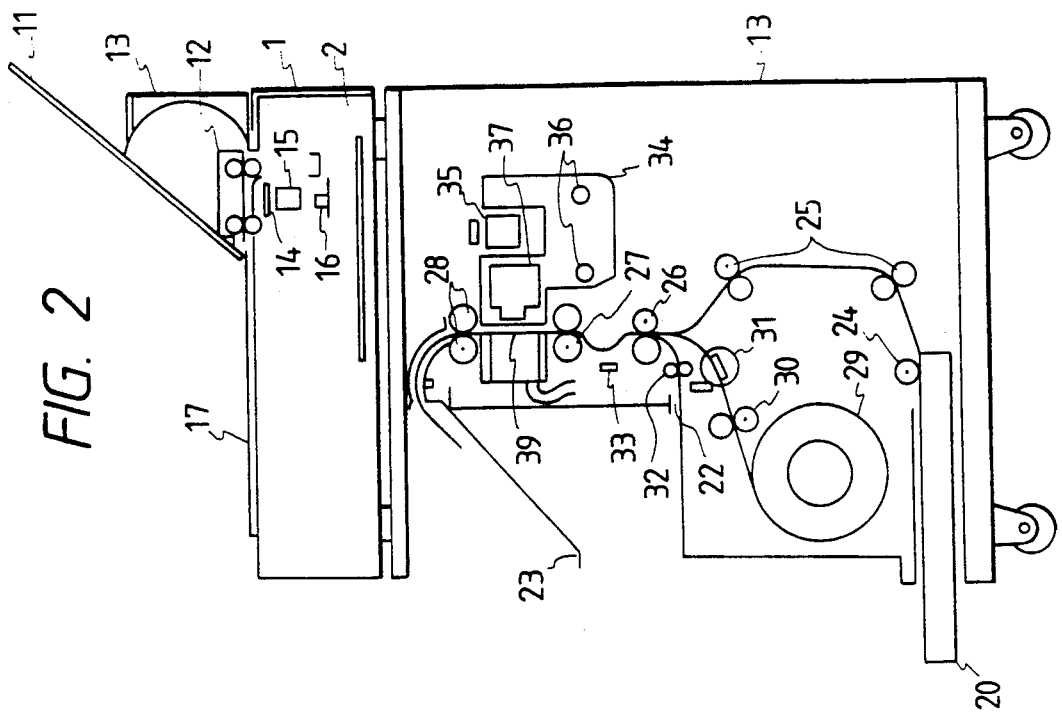
FIG. 2 is a side sectional view of the digital color copying machine shown in FIG. 1.

FIG. 2 is a side sectional view of the digital color copying machine shown in FIG. 1.

An image of an original placed on original table glass 17, an image projected from a projector, or an image of a sheet original fed by a sheet feeding mechanism 12 is read by an exposure lamp 14, a lens 15, and an image sensor 16 (a CCD having a plurality of light-receiving elements aligned in a line to read a full-color line image in this embodiment). The read image is processed by the scanner section 1 and the control section 2, and the processed image is recorded on a recording sheet at the printer section 3.

Referring to FIG. 2, recording paper includes small-sized (A4 to A3 sizes) cut sheets fed from a paper feed cassette 20 and a large-sized (A2 to A1 sizes) sheet fed from a paper roll 29 and cut into a predetermined length.

Recording sheets can be manually fed (manual feeding) one by one from a manual feed port 22 along a paper feed cover 21.

A pickup roller 24 picks up each cut sheet from the paper cassette 20. The picked cut sheet is fed to first rollers 26 by cut sheet feed rollers 25.

Paper from the paper roll 29 is fed by paper roll feed rollers 30 and is cut into a sheet having a predetermined length by a cutter 31. The cut sheet is then fed to the first rollers 26.

A recording sheet fed from the manual feed port 22 is fed to the first rollers 26 by manual feed rollers 32.

The pickup roller 24, the cut sheet feed rollers 25, the paper roll feed rollers 30, the first rollers 26, and the manual feed rollers 32 are driven by a paper feed motor (a DC motor is used in this embodiment) and are ON-/OFF-controlled by electromagnetic clutches attached to the respective rollers.

When a printing operation is started upon designation from the control section 2, the recording sheet selectively fed from any one of the above feed paths is conveyed to the first rollers 26. In order to prevent ramp of the recording sheet, a loop having a predetermined amount is formed at the first rollers 26, and the first rollers 26 are turned on to convey the recording sheet to second rollers 27.

In order to perform accurate sheet feeding between paper feed rollers 28 and the second rollers 27, a sheet is slakened to form a buffer having a predetermined amount between the first and second rollers 26 and 27. A buffer amount detection sensor 33 detects an actual buffer amount. The buffer is always formed during feeding of the sheet, so that loads acting on the paper feed rollers 28 and the second rollers 27 during feeding of particularly a large-sized sheet can be reduced, and accurate sheet feeding can be performed.

At the time of printing with recording heads 37, a scanning carriage 34 constituted by the recording heads 37 and the like is reciprocated along carriage rails 36 by a scanning motor 35. An image is printed on the recording sheet in a forward scanning path, and the recording sheet is fed by a predetermined amount by the paper feed rollers 28 in a backward scanning path. At this time, the driving system is controlled by the paper feed motor such that the predetermined amount of buffer is always maintained while the actual buffer amount is detected by the buffer amount detection sensor 33.

The printed recording sheet is delivered onto a delivery tray 23, thereby completing the printing operation.

A structure around the scanning carriage 34 will be described with reference to FIG. 3.

Referring to FIG. 3, a paper feed motor 40 is a drive source for intermittently feeding the paper feed rollers 28 and the second rollers 27 through a second roller clutch 43.

The scanning motor 35 is a drive source for scanning the scanning carriage 34 in directions indicated by arrows A and B through a scanning belt 42. In this embodiment, pulse motors are used to arrange the paper feed motor 40 and the scanning motor 35 since high-precision paper feed is required.

When the recording sheet reaches the second rollers 27, the second roller clutch 43 and the paper feed motor 40 are turned on to convey the recording sheet to the paper feed rollers 28 along a platen 39.

The recording sheet is detected by a paper sensor 44 on the platen, and detection information is used for positional control, jam detection, and the like.

When the recording sheet reaches the paper feed rollers 28, the second roller clutch 43 and the paper feed motor 40 are turned off. The recording sheet is chucked from the inside of the platen 39 by a suction motor (not shown), so that the recording sheet is brought into tight contact with the platen 39.

Prior to image recording to the recording sheet, the scanning carriage 34 is moved to a position sensor 41, and forward scanning is performed in a direction indicated by an arrow A. Inks of cyan C, magenta M, yellow Y, and black K are injected from predetermined positions of the recording heads 37 to record an image. When recording of an image having a predetermined length is completed, the scanning carriage 34 is stopped and backward scanning is started in a direction indicated by an arrow B, so that the scanning carriage 34 returns to the position of the home position sensor 41. During backward scanning, upon driving of the paper feed rollers 28 by the paper feed motor 40, the sheet is fed in a direction of an arrow C by a length corresponding to the portion recorded by the recording heads 37.

In this embodiment, four recording heads 37 are used. Each recording head includes 256 ink-jet nozzles.

When the scanning carriage 34 is stopped at the position detected by the home position sensor 41, a recovery operation of the recording heads 37 is performed to perform stable recording. In order to prevent variations in injection start timings which are caused by changes in viscosities of inks remaining in the nozzles of the recording heads 37, pressurized air is supplied to blow out the inks from the recording heads 37 on the basis of programmed conditions such as paper feed timings, temperatures inside the apparatus, and injection timings.

The above operations are repeated to perform image recording on the entire surface of the recording sheet.

Figure 5:
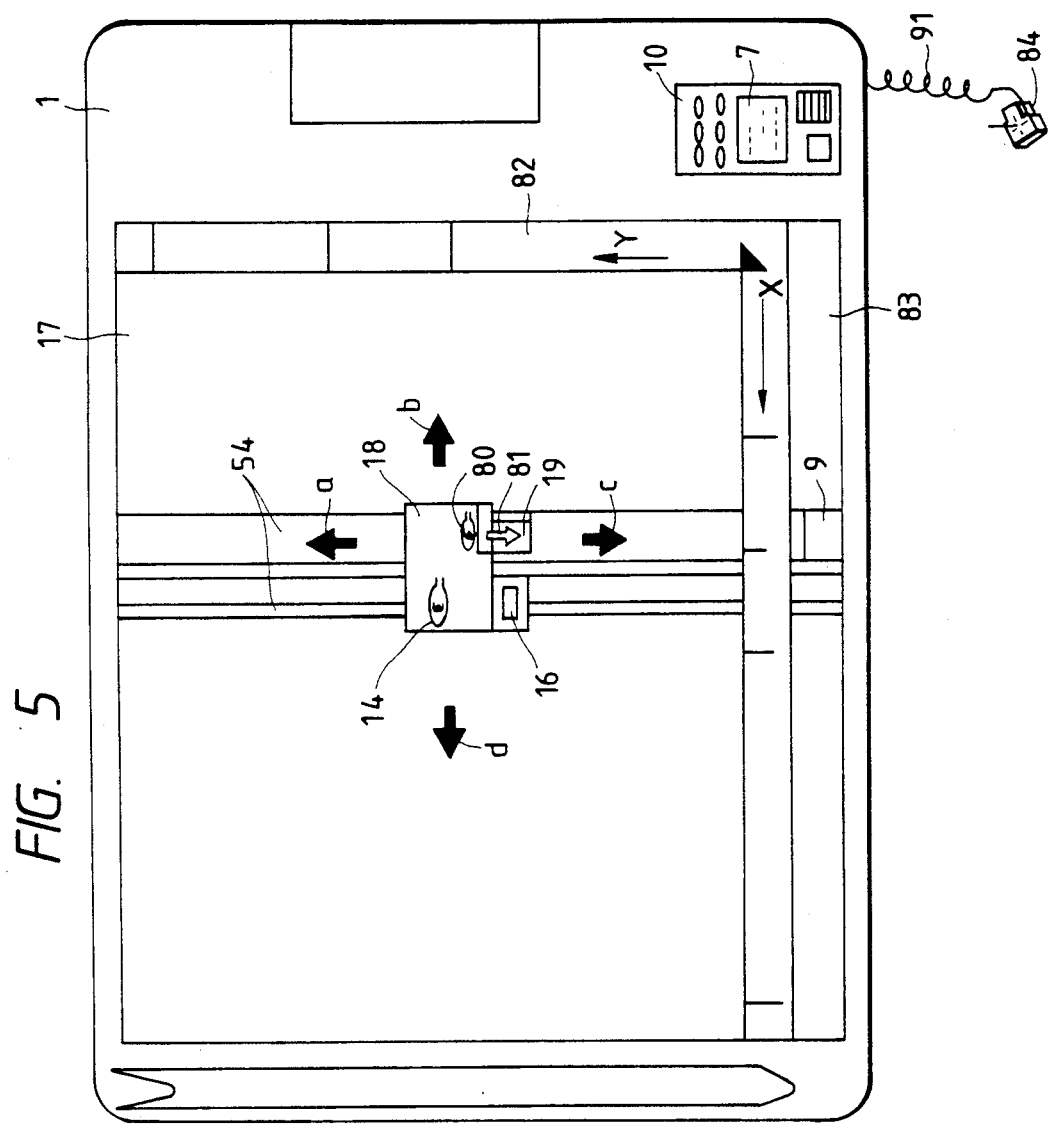
FIG. 5 is a view showing a scanner section of the embodiment.

FIG. 5 is a plan view of the scanner section 1.

In the scanner section 1, an original on the original table glass 17 is illuminated by the original exposure lamp 14 on a CCD unit 18. Light reflected by the original is converted into an electrical signal by a photoelectric transducer constituted by the CCD 16 and the lens 15.

The CCD 16 comprises a color read CCD which can color-separate 256 pixel data into R, G, and B color components, and can read the color-separated components.

The CCD unit 18 can be vertically (directions indicated by arrows a and c) moved along rails 54 and can be horizontally (directions indicated by arrows b and d) moved along lateral rails (not shown) by independent stepping motors (not shown). In a normal operation, since the original is placed on the original table glass 17, the CCD unit 18 is then moved in the direction of the arrow a to read the image on the original. The CCD unit 18 is moved in the direction of the arrow d by a distance corresponding to 256 pixels (no reading is performed in this case) while the CCD unit 18 is being moved backward (the direction of the arrow c). These read operations are repeated. When reading for a required size is completed, the CCD unit 18 returns to the home position. In this case, since home position sensors (not shown) are arranged in the directions of the arrow b and c, the CCD unit 18 returns to the home position defined by these home position sensors.

A coordinate lamp 80, a coordinate designation arrow 81, and a reflection mirror 19 are attached to the CCD unit 18 and are moved together with it.

A mirror 9 is fixed on the rail 54 and can be moved to the right and left (the directions indicated by the arrows b and d).

An index 82 is arranged to allow an operator to understand the original reference and its size.

A window 83 is formed to allow the operator to observe the original through the mirrors 9 and 19. Since the two mirrors 9 and 19 are used, the operator can observe an erect original image.

The operation unit 10 is used to designate copying operations. The touch panel display 7 is arranged on the operation unit 10 to change screen and key display contents in every mode, thereby improving operability. A coordinate designation unit (to be referred to as a stick controller hereinafter) 84 controls movement of the CCD unit 18 during coordinate designation.

Figure 6:
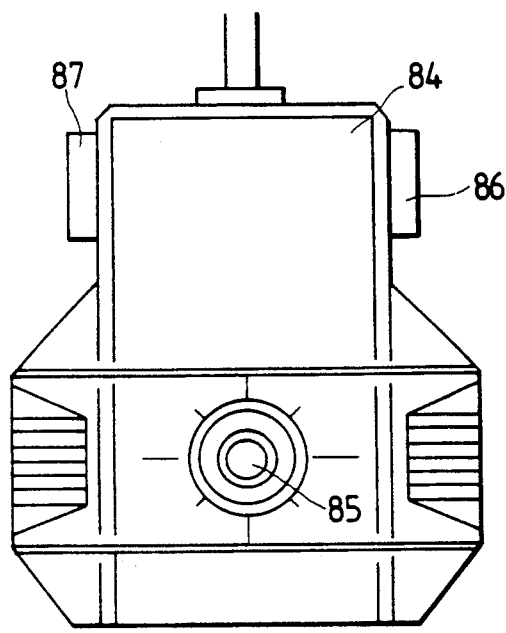
FIG. 6 is a view showing a stick controller.

FIG. 6 shows an outer appearance of the stick controller 84.

When a coordinate designation mode is set using keys in the operation unit 10 and a stick 85 is moved in upper, lower, right, and left directions, the CCD unit 18 is moved in the upper, lower, right, and left directions accordingly.

The upper, lower, left, and right switches are arranged around the stick 85. When the stick 85 is moved in one direction, the corresponding switch is turned on/off.

Control of the stick 85 and the CCD unit 18 will be described in detail with reference to a flow chart later.

A coordinate input button 87 is used to store coordinates designated by the CCD unit 18 in a controller (not shown) of the system.

A speed button 86 is used to control a moving speed of the CCD unit 18 (its detail will be described in a flow chart later).

Figure 7:
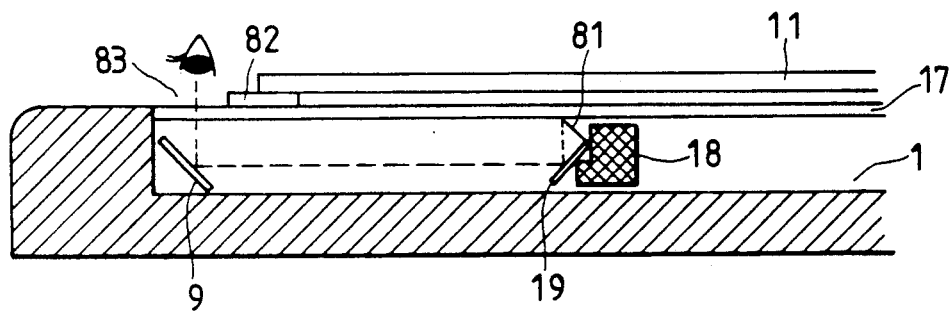
FIG. 7 is a view for explaining coordinate designation.

A method of detecting coordinates is shown in FIG. 7. The lower surface of the original placed on the original table glass 17 is illuminated by the lamp 80 on the CCD unit 18. An image of the original can be visually observed by the operator through the window 83 by means of the mirrors 19 and 9.

The operator sets the distal end of the arrow 81 at a desired coordinate point upon operation of the stick controller 84 while monitoring the distal end of the arrow 81 through the mirrors. The coordinate input button 87 is depressed to store the designated coordinates in the controller.

Since the original is illuminated from the lower side by the coordinate lamp 80, coordinate designation can be performed while an original holder 13 covers the original. Therefore, the original position is not changed and accurate coordinate designation can be performed.

In the system of this embodiment, the read light source and the coordinate designation light source are independent light sources. However, a common light source may be used for original reading and coordinate designation.

An operation of the scanner section 1 will be described with reference to FIGS. 8 and 9.

Figure 8:
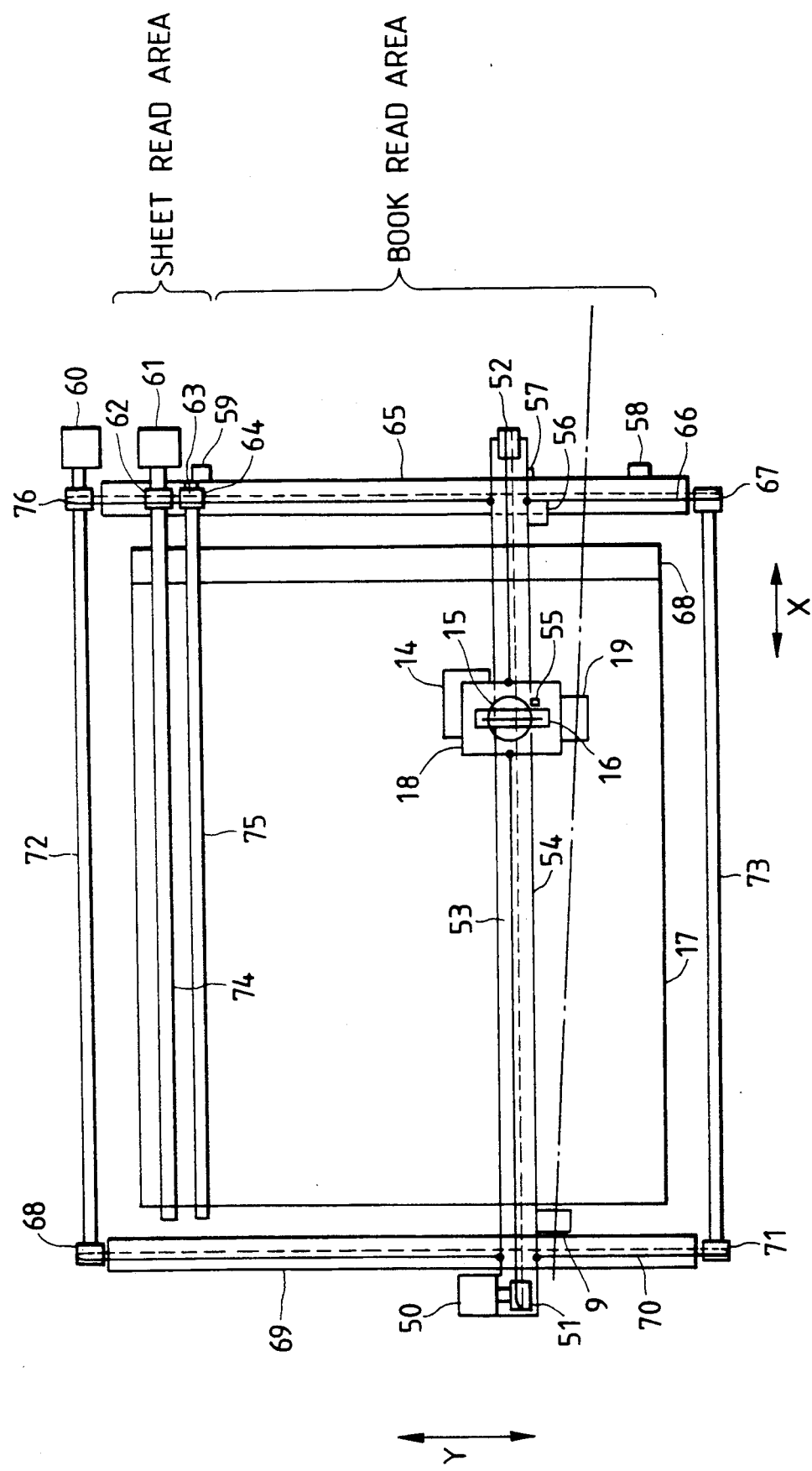
FIG. 8 is a view showing an internal mechanism of the scanner section.

FIG. 8 is a view for explaining a mechanism inside the scanner section 1.

The CCD unit 18 is a unit including the CCD 16 and the lens 15 and is moved along the rails 54 by a main scanning drive system including a main scanning motor 50, pulleys 51 and 52, and a wire 53, thereby reading an image on the original table glass 17 along the main scanning direction. The mirror 19 is attached to the CCD unit 18, and the mirror 9 is mounted on the rail 54 to detect an image pickup position of the CCD unit 18. A light-shielding plate 55 and a home position sensor 56 are used to perform positional control for moving the CCD unit 18 to a main scanning home position defined in a correction area 68 shown in FIGS. 8 and 9.

The rails 54 are bridged between rails 65 and 69 and are driven by a sub scanning drive system including a subscanning motor 60, pulleys 67, 68, 71, and 76, shafts 72 and 73, and wires 66 and 70. A light-shielding plate 57 and home position sensors 58 and 59 are used to perform positional control for moving the rails 54 to the sub scanning home positions in a book mode for reading an original such as a book or a three-dimensional object placed on the original table glass 17 and a sheet mode for reading an image on a sheet.

A sheet feed motor 61, sheet feed rollers 74 and 75, pulleys 62 and 64, and a wire 63 constitute a mechanism for feeding an original sheet. This mechanism is arranged on the original table glass 17 to cause the sheet feed rollers 74 and 75 to feed the faced-down original sheet by a predetermined amount.

As described above, the mirror 19 is attached to the CCD unit 18 while being inclined at 45° and is moved together with the CCD unit 18 (the compact illumination lamp 80 is arranged on the upper portion of the mirror and can be ON/OFF-controlled by a control unit 111). The mirror 9 is mounted on the rail 54 which can be moved in the right-and-left direction while the mirror 9 is inclined at 45°. When the operator watches the mirror 9, he can observe an erect original image just above the mirror 19.

In this embodiment, in order to prevent interference between the CCD 16 and the mirror 19, the read position of the CCD 16 is slightly offset from the position designated by the arrow 81 of the mirror 19. This offset is electrically corrected (to be described later).

Figure 10:
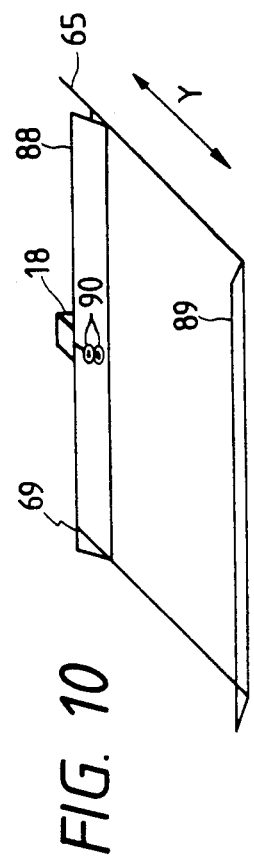
FIG. 10 is a view showing another arrangement of a coordinate designation mechanism.

In this embodiment, the mirrors 19 and 9 are moved together with the CCD unit 18. However, a mirror 88 having a main scanning width in the X direction and bridged between the rails 65 and 69 and a mirror 89 bridged between the ends of the rails 65 and 69 may be used in place of the mirrors 19 and 9, as shown in FIG. 10.

In this embodiment, the coordinate designation arrow 81 and the original read CCD 16 are arranged at different positions on the CCD unit 18. However, the coordinate designation unit and the original reader unit may be arranged at the same position, and the position of the coordinate designation unit may be offset from that of the original reader unit by a mechanical means (e.g., the reflection mirror may be extended or retracted by a motor or the like).

The stick controller 84 is connected to the main body (the control unit 111) through a cable 91 and can be carried by a hand of the operator. The stick 85 can be pivoted in one of the upper, lower, right, and left directions, and the corresponding switch is turned on. The switch ON signal is supplied to the control unit 111 through the cable 91. In a color balance monitor mode, when the button 87 for designating registration of coordinates is depressed, the CCD unit 18 is moved such that the CCD 16 reads the position of the mirror 19. Color information of the designated coordinates is measured and is displayed, as shown in FIG. 4.

Figure 9:
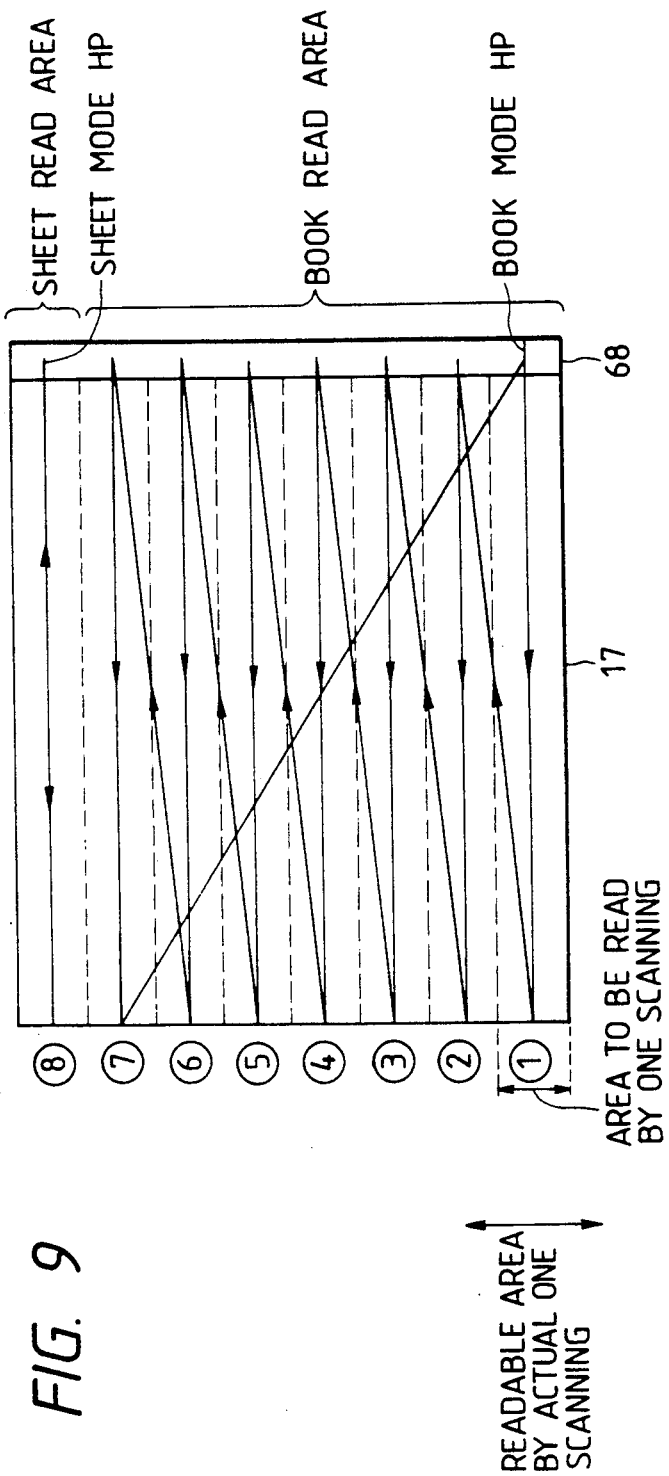
FIG. 9 is a view for explaining read operations in book and sheet modes.

FIG. 9 is a view for explaining read operations in the book and sheet modes.

In the book mode, the CCD unit 18 is moved to the book mode home position (book mode HP) in the correction area 68 in FIG. 9, and an image on the entire surface of the original placed on the original table glass 17 is started.

Prior to scanning of the original, processing operations such as shading correction, black level correction, and color correction are performed in the correction area 68. Thereafter, scanning in the main scanning direction, i.e., the illustrated direction, is started by the main scanning motor 50. When image reading of an area 1 is completed, the main scanning motor 50 is rotated in the reverse direction. At the same time, the sub scanning motor 60 is driven to move the CCD unit 18 to an area ② in the correction area 68 in the sub scanning direction. Subsequently, processing operations such as shading correction, black level correction, and color correction are performed as needed in the same manner as in main scanning of the area ①, and image reading of the area ② is performed.

By repeating the above scanning operations, the image on the areas ① to ⑦ is read. After the image in the area ⑦ is completed, the CCD unit 18 returns to the book mode home position.

In this embodiment, in order to read an original having a maximum size of A2 on the original table glass 17, the number of scanning cycles must be increased in practice. The operational description is simplified to readily understand the present invention.

In the sheet mode, the CCD unit 18 is moved to the sheet mode home position (sheet mode HP). An image in an area ⑧ is repeatedly read while the original sheet is intermittently moved by the sheet feed motor 61, and an image on the entire original sheet is thus read.

Prior to scanning of the original, processing operations such as shading correction, black level correction, and color correction are performed in the correction area 68. Thereafter, scanning in the main scanning direction, i.e., the illustrated direction, is started by the main scanning motor 50. When reading in the forward path of the area ⑧ is completed, the main scanning motor 50 is rotated in the reverse direction. In the backward path, the sheet feed motor 61 is driven to move the original sheet by a predetermined amount in the sub scanning direction. Subsequently, the above operations are repeated to read the image on the entire surface of the original sheet.

When the above read operation is performed in a one-to-one magnification mode, an area scanned with the CCD unit 18 is a large area in practice, as shown in FIG. 5 because the digital color copying machine of this embodiment incorporates an enlargement/reduction function. The recordable area of the recording heads 37 in each read cycle is fixed as a 256-bit area. Therefore, if, for example, a 50% reduction copying operation is performed, image information of a 512-bit area is required.

The scanner section 1 can read an overlap portion between a plurality of scanning areas.

Figure 11:
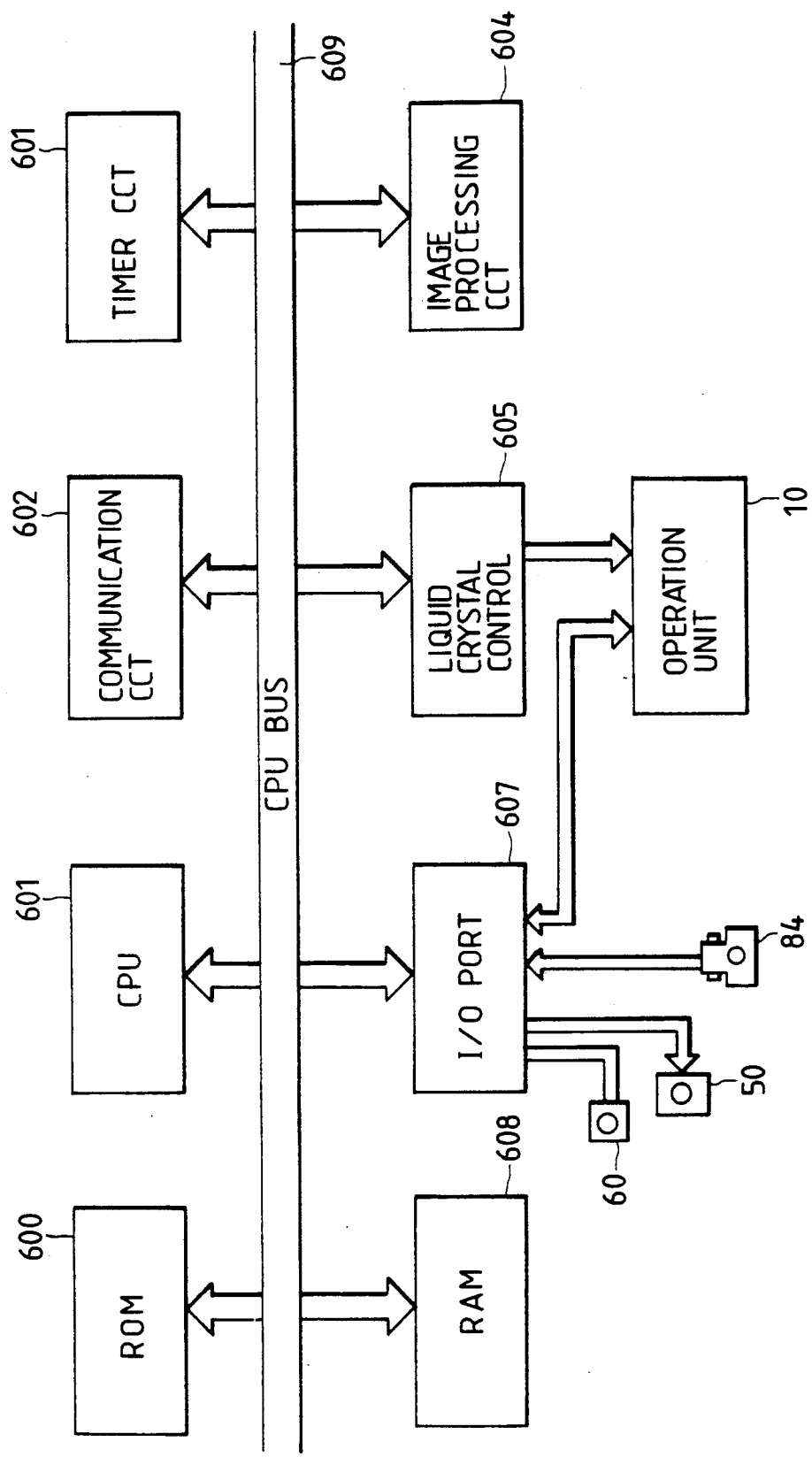
FIG. 11 is a schematic block diagram showing an internal circuit arrangement of the digital color copying machine.

FIG. 11 is a schematic block diagram showing an internal arrangement of the digital color copying machine shown in FIG. 1.

A CPU 601 controls the overall operation of the copying machine by using a RAM 608 connected to a CPU bus 609 and an I/O port 607 in accordance with programs stored in a ROM 600.

A communication circuit 602 communicates with the printer section 3 serving as an image forming apparatus and a host computer. A timer circuit 603 is used for various processing operations.

An image processing circuit 604 performs various operations (variable magnification) for outputting image data to an external device.

A liquid crystal control 605 is a control for controlling the touch panel display 7 in the operation unit 10. The I/O port 607 controls various inputs and outputs. For example, the I/O port 607 controls key inputs from the operation unit 10, inputs from the stick controller 84, and at the same time controls the stepping motors 50 and 60 for moving the CCD unit 18.

Figure 12:
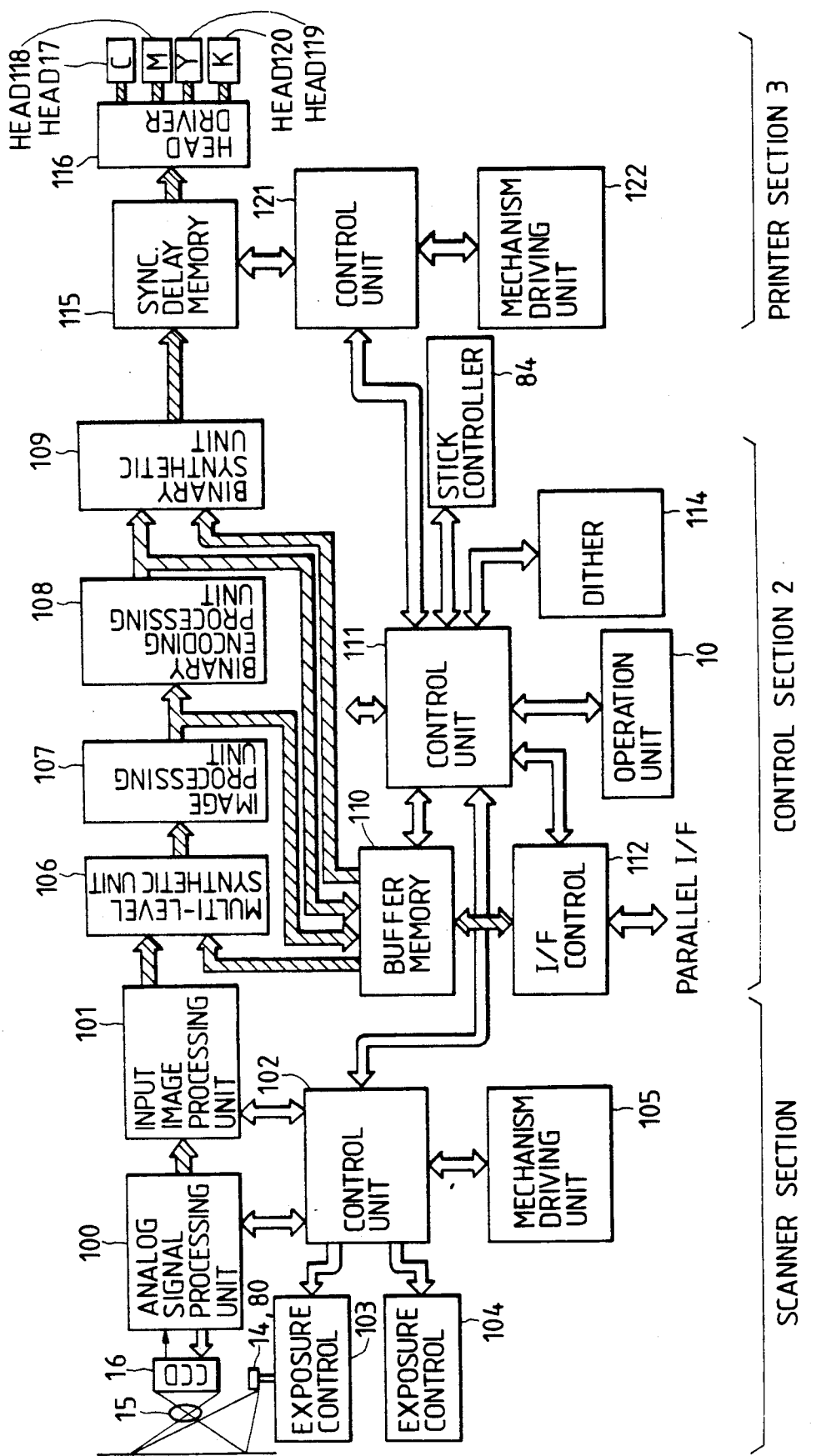
FIG. 12 is a detailed functional block diagram of the digital color copying machine.

Functional blocks of the digital color copying machine of this embodiment will be described with reference to FIG. 12 which illustrates a detailed arrangement of the image processing circuit 604 shown in the block diagram of FIG. 11.

A control unit 102, the control unit 111, and a control unit 121 are control circuits for controlling the scanner section 1, the control section 2, and the printer section 3, respectively. The control units 102, 111, and 121 are constituted by a microcomputer, a program ROM, a data memory, a communication circuit, or the like. The control units 102 and 111 and the control units 111 and 121 are connected through communication lines. The control units 102 and 121 are operated under the control of the control unit 111 to constitute a so-called master-slave control form.

When the apparatus is operated as a color copying machine, the control unit 111 performs control operations in accordance with inputs from the operation unit 10, the stick controller 84, and a digitizer 114.

The control unit 10 is arranged, as previously described with reference to FIG. 4 and includes a liquid crystal display. The liquid crystal display is covered with a touch panel made of a transparent electrode panel, thereby allowing selective designation such as color designation and editing designation. The operation unit 10 also includes independent keys as keys frequently used, e.g., a key for designating the start of copying (i.e., a start key), a key for designating interruption of copying (i.e., a stop key), and a key for changing an operation mode to a standard mode (i.e., a reset key).

The digitizer 114 is used to input processing area positional information for trimming, masking, color conversion, and the like and is optionally connected when complicated editing is required.

The control unit 111 controls a versatile parallel interface (so-called GP-IB interface such as IEEE-488) control circuit (i.e., an I/F control unit 112). Input/output operations of the image data between the external devices and remote control by the external device can be performed through this interface.

The control unit 111 also controls a multi-level synthetic unit 106 for performing various image processing operations, an image processing unit 107, a binary encoding processing unit 108, a binary synthetic unit 109, and a buffer memory 110.

The control unit 102 performs control of a mechanism drive unit 105 for controlling driving of a mechanism of the scanner section 1, an exposure control 103 for performing exposure control of the lamps 14 and 80 during reflection original reading and coordinate designation, and an exposure control 104 for performing exposure control of a halogen lamp upon use of a projector. The control unit 102 also controls an analog signal processing unit 100 for performing various image processing operations and an input image processing unit 101.

The control unit 121 controls a mechanism driving unit 122 for controlling to drive a mechanism of the printer section 3 and a sync delay memory 115 for correcting variations in time of the operation of mechanisms in the printer section 3 and delays caused by the mechanical alignment of recording heads 117 to 120.

A flow of an image reading will now be described in more detail with reference to the image processing blocks in FIG. 12.

An image formed on the CCD 16 is converted into an analog electrical signal by the CCD 16. The converted image data is serially processed in an order of red, green, and blue components, and the processed data is input to the analog signal processing unit 100.

The analog signal processing unit 100 performs sample/hold processing, dark level correction, and dynamic range control in units of color components, i.e., red, green, and blue components. The analog signal processing unit 100 performs analog-to-digital conversion (A/D conversion) and outputs a serial multi-level (8-bit data of each color component) digital image signal to the input image processing unit 101.

The input image processing unit 101 causes a read system to perform necessary correction operations such as shading correction, color correction, and gamma-correction and image magnification of the serial multi-level digital image signal.

The multi-level synthetic unit 106 in the control section 2 selects the serial multi-level digital image signal supplied through the parallel I/F or the serial multi-level digital image signal sent from the scanner section 1 and synthesizes these signals. The selected and synthesized image data is supplied to the image processing unit 107 as the serial multi-level digital image signal.

The image processing unit 107 performs edge emphasis, black extraction, UCR, and masking for correcting colors of recording inks used in the recording heads 117 to 120. The serial multi-level digital image signal output is input to the binary encoding processing unit 108 and the buffer memory 110.

The binary encoding processing unit 108 binarizes the serial multi-level digital image signal in accordance with an error diffusion method. The serial multi-level digital image signal is converted into four-color binary parallel image signals. The four-color data is input to the binary synthetic unit 109, and three-color data is supplied to the buffer memory 110.

The binary synthetic unit 109 extracts a necessary image area and erases an unnecessary image area from the three-color binary parallel image signal sent from the buffer memory 110 in accordance with the area designated by the stick controller 84. The binary synthetic unit 109 selects the four-color binary parallel image signal sent from the binary encoding processing unit 108 and synthesizes it with the binary parallel image signal sent from the buffer memory to obtain a four-color binary parallel image signal as needed.

The buffer memory 110 inputs or outputs a multi-level image and a binary image through the parallel I/F.

The sync delay memory 115 in the printer section 3 absorbs variations in time of the mechanism operation of the printer section 3 and corrects a delay caused by mechanical alignment of the recording heads 117 to 120. The sync delay memory 115 generates internal timing signals required for driving the recording heads 117 to 120.

A head driver 116 is an analog drive circuit for driving the recording heads 117 to 120 and generates internal signals for directly driving the recording heads 117 to 120.

The recording heads 117 to 120 inject inks of cyan C, magenta M, yellow Y, and black K and record an image on a recording sheet.

Figure 13:
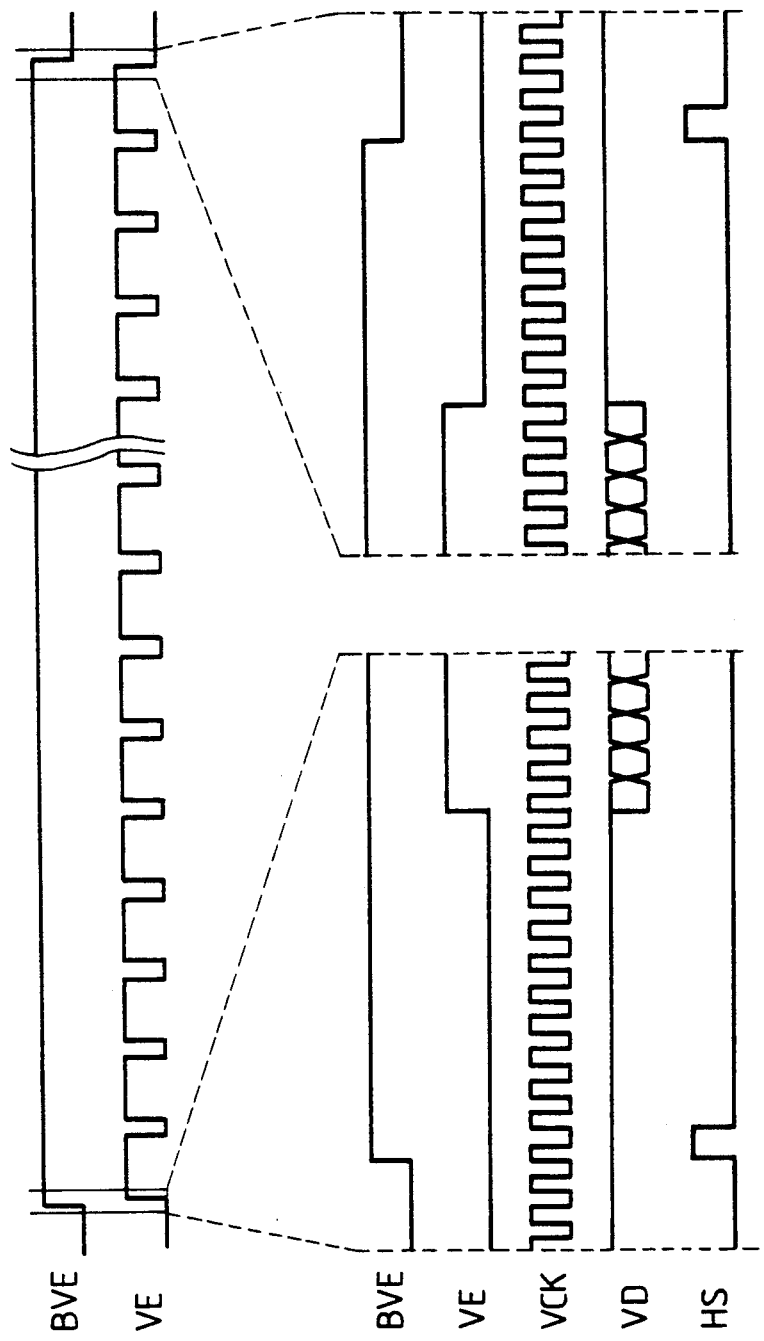
FIG. 13 is a view showing a timing chart of an image.

FIG. 13 is a timing chart for recording an image by the circuit blocks described with reference to FIG. 12.

A signal BVE is a signal representing an image valid interval of each scanning in main scanning reading described with reference to FIG. 9. The signal BVE is output a plurality of times to output an image of the entire surface of the original.

A signal VE is a signal representing an image valid interval of every line read by the CCD 16. The signal VE is valid only while the signal BVE is valid.

A signal VCK is a clock signal for sending out image data VD. The signals BVE and VE are changed in synchronism with the signal VCK.

A signal HS is a signal used when the signal VE repeats valid and invalid intervals during one-line output, and is not necessary when the signal VE is continuously valid during one-line output. That is, the signal HS is a signal representing the start of a one-line image output.

Figure 14:
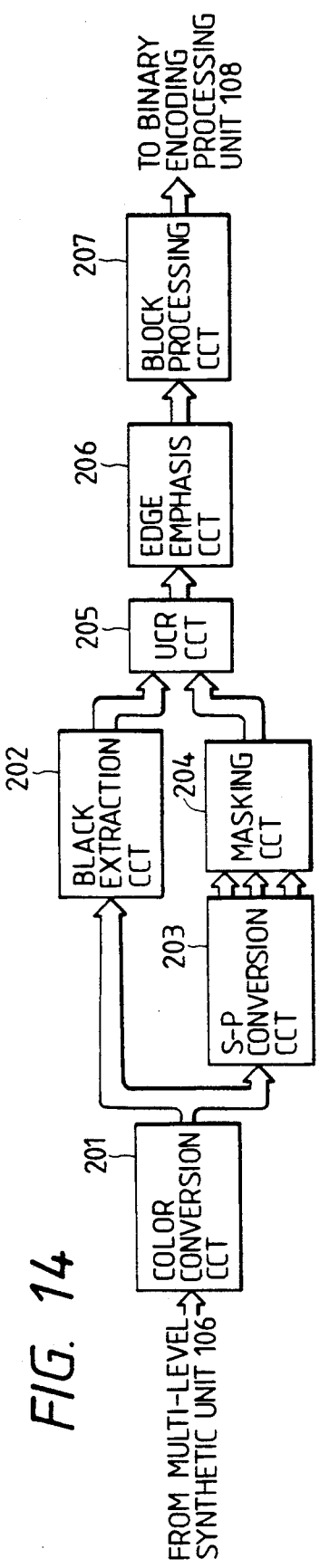
FIG. 14 is a block diagram showing a detailed circuit arrangement of an image processing unit.

A detailed circuit arrangement of the image processing unit 107 will be described in more detail with reference to FIG. 14.

The color-sequential three-color (cyan C, magenta M, and yellow Y) multi-level image data sent from the multi-level synthetic unit 106 is input to a color conversion circuit 201. The color conversion circuit 201 is a circuit for electrically converting a specific color designated by the digitizer 114 or the like into another color. Upon processing of the signal through the color conversion circuit 201, a specific color (e.g., a background color in a design image) of the original can be converted into an arbitrary color.

A serial-parallel signal conversion circuit (S-P conversion circuit) 203 separates the color-sequential three-color multi-level image data into each color in order to cause a masking circuit 204 as the next stage to perform color processing.

The masking circuit 204 performs color data correction in consideration of the input color data and color reproducibility at the printer section. More specifically, the masking circuit 204 performs the following matrix calculation:

$$\begin{bmatrix} Y' \\ M' \\ C' \end{bmatrix} = \begin{bmatrix} a_{11}, a_{12}, a_{13} \\ a_{21}, a_{22}, a_{23} \\ a_{31}, a_{32}, a_{33} \end{bmatrix} \begin{bmatrix} Y \\ M \\ C \end{bmatrix}$$

where
Y, M, and C are input data
Y', M', and C' are output data
$a_{11}$ to $a_{33}$ are correction coefficients.

A black extraction circuit 202 calculates and extracts a black component (black K) from the color-sequential 3-color multi-level image data. The black extraction circuit 202 calculates as a black component the color component data having a lowest density of the densities of cyan C, magenta M, and yellow Y. An under color removal (UCR) circuit 205 performs calculations between the black K component extracted by the black extraction circuit 202 and the cyan C, magenta M, and yellow Y components. Upon processing through the UCR circuit, the color-sequential three-color multi-level image data (cyan C, magenta M, and yellow Y) is converted into color-sequential four-color (cyan C, magenta M, yellow Y, and black K) data.

Gamma-correction and offset processing of the image data values may be performed in the UCR circuit 205 as needed.

An edge emphasis circuit 206 extracts edge components in units of colors and performs additions and subtractions of the original image data. The edge emphasis circuit 206 is arranged to improve reproducibility of thin lines and perform image reproduction with high contrast. For example, edge components are extracted by using a 3×3 matrix shown in FIG. 15.

A block processing circuit 207 minimizes a fringe pattern particularly formed in a highlight portion of the image when the error diffusion method is applied.

The image data processed by the block processing circuit 207 is binary-encoded by the binary encoding processing unit 108 in accordance with the error diffusion method.

The block processing circuit 207 is arranged to eliminate a fringe pattern formed in a highlight portion near a portion in which a density is abruptly changed. For example, an image is divided into blocks each having a 4×4 matrix size to determine whether a block of interest belongs to the highlight portion in accordance with a predetermined algorithm. If the block of interest belongs to the highlight portion, densities of pixels within the block of interest are represented by a density of a specific pixel, and pseudo dot encoding is performed to prevent concentration of the printing dots, thereby preventing formation of a fringe pattern.

Figure 16:
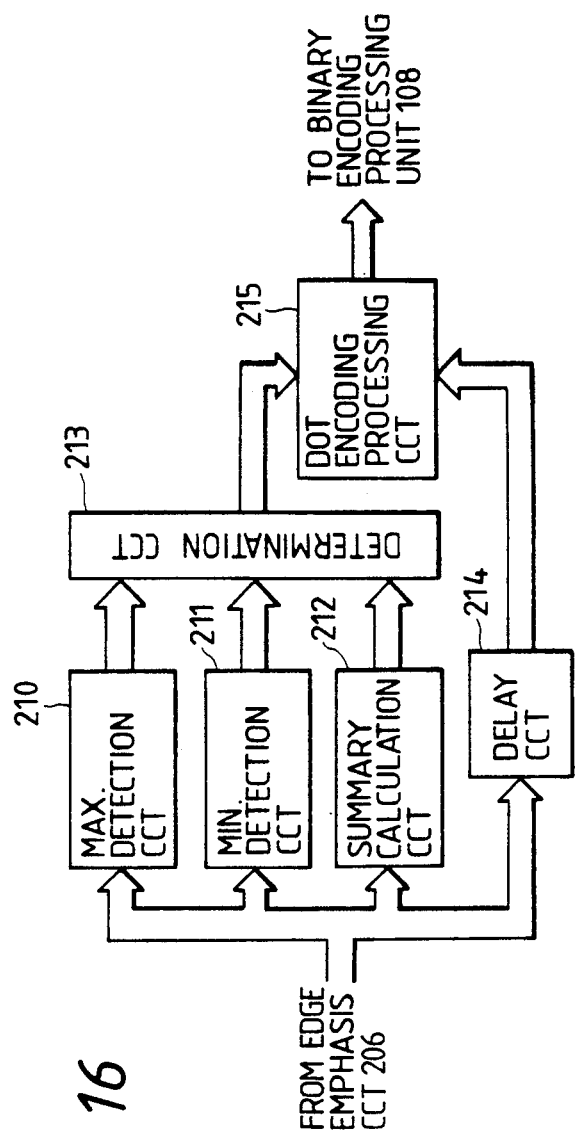
FIG. 16 is a block diagram showing a detailed arrangement of a block processing circuit.

A detailed circuit arrangement of the block processing circuit 207 will be described with reference to FIG. 16.

A maximum (MAX) detection circuit 210 and a minimum (MIN) detection circuit 211 respectively detect a maximum density value Dmax and a minimum density value Dmin of the pixels belonging to the block having a 4×4 matrix size.

A summary calculation circuit 212 calculates a summary (i.e., summation) Dsum of densities of the pixels within a block of interest.

A determination circuit 231 performs determination processing under the following conditions by using the maximum density value Dmax, the minimum density value Dmin, and the summary Dsum.

Dsum < Dconst1 (=constant)
Dmax − Dmin < Dconst2 (=constant)

When the above two conditions are satisfied, a dot encoding circuit 215 performs pseudo dot encoding of the pixels within the block of interest. Otherwise, the image data is not processed.

A delay circuit 214 comprises a line buffer for performing a delay operation of the pixels during determination processing. For example, when the image is divided into blocks each having a 4×4 matrix size, the delay circuit 214 has a 4-line buffering capacity.

When the above two conditions are satisfied, the dot encoding circuit 215 performs processing (FIG. 17) of the pixels within the block of interest. In this case, each block has a 4×4 matrix size.

The density of each # pixel is reduced to 1/n to preserve all density data within the block, and the density of the * pixel is increased by an amount corresponding to the decrease in density. Since the density data is preserved, the advantage of the error diffusion method is not lost by the above processing.

A density distribution and processing block may be finely generated by increasing the number of determination levels.

The blocks may be changed in units of color components as in blocks A and B so as not to overlap dots in units of color components.

More specifically, a pixel whose density is increased has a higher possibility of dot formation. The processing block is changed to A or B to prevent concentration of density values, so that a possibility of double dot formation can be reduced.

Block processing is performed as described above, so that the printing dots can be dispersed. Therefore, a fringe pattern formed in a highlight portion near a portion in which a density is abruptly changed can be prevented.

A detailed circuit arrangement of the binary encoding processing unit 108 will be described with reference to FIGS. 18 and 19.

Assume that image data is given as a two-dimensional data array, and image data of the ith position in the main scanning direction and the jth position in the sub scanning direction is represented by $D_{i,j}$.

Figures 15, 17, 19:
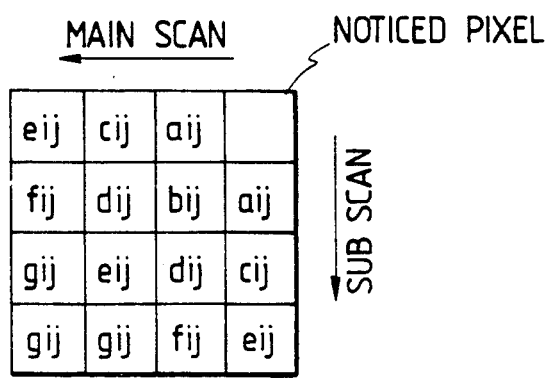
FIG. 15 is a view showing an edge emphasis matrix.
FIG. 17 is a view showing a dot encoding processing matrix.
FIG. 19 is a view showing an error diffusion matrix.

FIG. 19 is an error diffusion matrix. Error data generated during binary encoding of any image data ($D_{i,j}$) as a noticed pixel input to the binary encoding processing unit 108 are classified into 15 error data at a given ratio, and these error data are distributed to the peripheral pixels. A position i,j of each error data represents that an error occurs in the image data $D_{i,j}$.

In binary encoding, when the pixel position is shifted one by one in the main scanning direction of the matrix in FIG. 19, the errors are accumulated. A sum of the summary of the errors distributed from a plurality of pixels and the image data input as the noticed pixel is binary-encoded.

Figure 18:
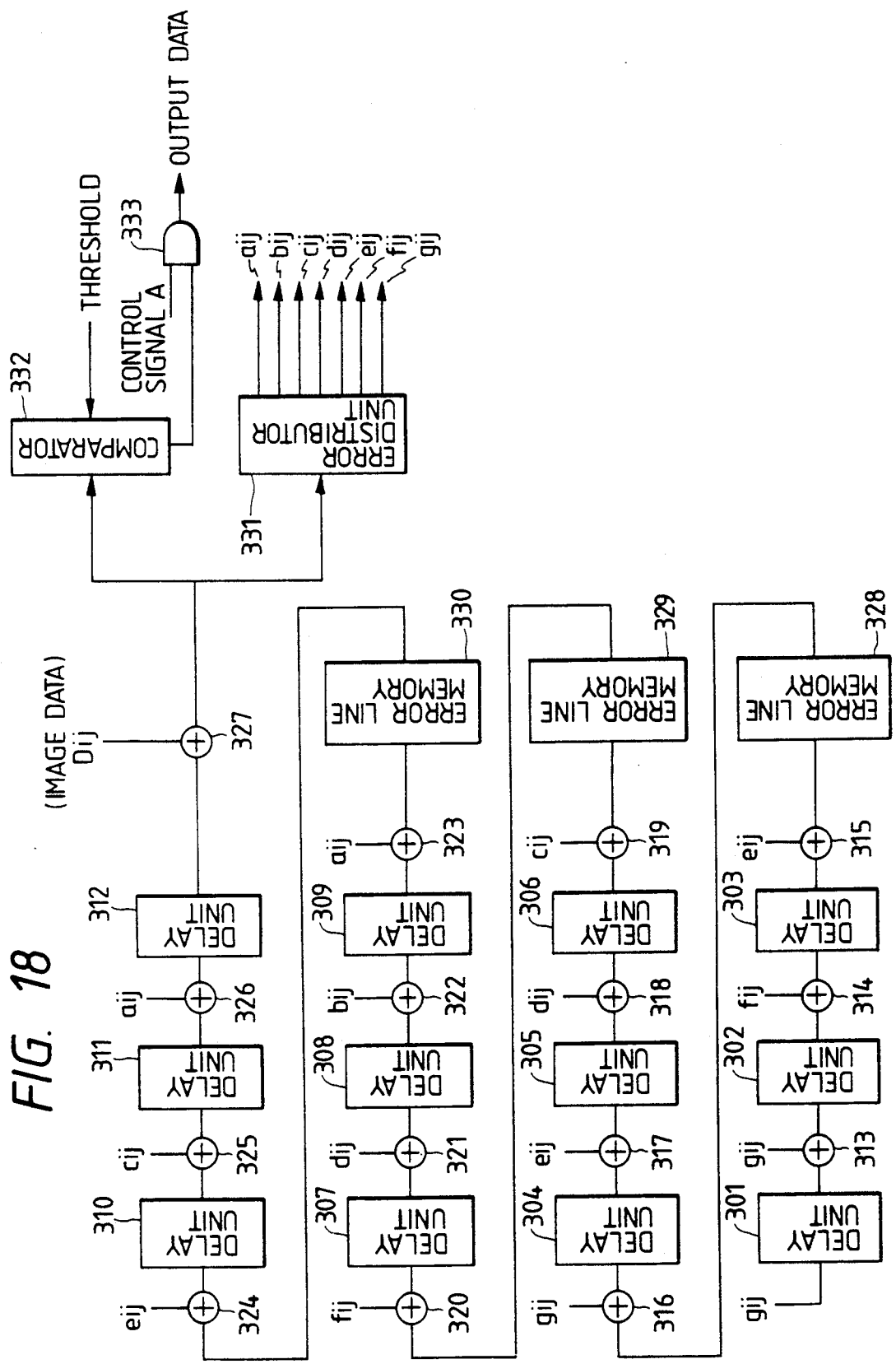
FIG. 18 is a block diagram showing a detailed arrangement of a binary encoding processing unit.

FIG. 18 is a block diagram of the binary encoding unit of this embodiment.

Referring to FIG. 18, delay units 301 to 312 comprise flip-flops constituting four stages. In order to process the color-sequential image data (cyan, magenta, yellow, and black) in units of color components, each delay unit performs a four-clock data delay to perform a one-pixel delay.

Adders 313 to 326 perform additions and subtractions between the error data to perform error calculations within the error diffusion matrix. An adder 327 performs additions and subtractions of the input image data and error data as a result of the error calculations within the error diffusion matrix.

Error line memories 328 and 330 comprise FIFO (First-In First-Out) memories. Each memory stores the error calculation result of each line and performs a one-line delay.

An error distributor unit 331 comprises a ROM (Read-Only Memory). A comparator 332 compares the calculation results of the image data and the error data with a preset threshold value. A gate circuit 333 gates the output data.

An operation of the circuit shown in FIG. 18 will be described below.

Image data input to the binary encoding processing unit 108 is added by the adder 327 to error data output from the delay unit 312. The sum data is input to the error distributor unit 331. The error distributor unit 331 outputs error data (a,b,c,d,e) calculated by a predetermined distribution ratio by using a look-up table of a ROM. An output from the adder 327 is compared with the predetermined threshold by the comparator 332, and the comparator 332 outputs a binary signal of logic "1" or "0". The binary-encoded output from the comparator 332 is input to the gate 333, so that only data of necessary pixels is output.

If error data output from the error distributor unit 331 with respect to the image data $D_{i,j}$ are given as $a_{i,j}$, $b_{i,j}$, $c_{i,j}$, $d_{i,j}$, $e_{i,j}$, $f_{i,j}$, and $g_{i,j}$, error data $g_{i,j}$ is delayed by a four-color amount by the delay unit 301, and the delayed data is added by the adder 313 to error data $g_{i+1,j}$ having the same color as that of the delayed data and generated by the pixel of the image data $D_{i+1,j}$.

Similarly, the error data are sequentially processed by the components 302, 314, 303, and 315, and outputs from the adder 315 are input to the line memory 328. The stored data is delayed by a one-line amount by the line memory 328, and the one-line delayed data is output therefrom. The readout error sum data is input to the adder 316.

Similarly, error data generated in other pixel data are sequentially added by the components 304, 317, 305, 318, 306, and 319, and the sum data is then added with error data $c_{i+3,j+1}$ generated in the input image data $D_{i+3,j+1}$ by the adder 319. The sum data is input to the line memory 329.

The error data output from the line memory 329 is input to the adder 320. Similarly, the sum data is similarly processed by the components 307, 321, 308, 322, 309, and 323 and is added by the adder 323. The output data is then input to the line memory 330.

The error data output from the line memory 330 is added with the error data by the components 324, 310, 325, 311, and 326 and is then added with the error data by the adder 327. The sum of the error and image data is input to the error distributor unit 331 and the comparator 332.

The above operations will be mathematically expressed by exemplifying the input image data $D_{i,j}$ as follows.

$$DD_{i,j} = D_{i,j} + g_{i-3,j-3} + g_{i-2,j-3} + f_{i-1,j-3} +$$
$$e_{i,j-3} + g_{i-3,j-2} + e_{i-2,j-2} + d_{i-1,j-2} +$$
$$c_{i,j-2} + f_{i-3,j-1} + d_{i-2,j-1} + b_{i-1,j-1} +$$
$$a_{i,j-1} + e_{i-3,j} + c_{i-2,j} + a_{i-1,j}$$

where
DD is data after the calculation
D is image data
i is the pixel number (in units of color components) in a line
j is the line number An operation of the circuit will be described with reference to a timing chart in FIG. 20. A single-color timing chart is exemplified for the sake of better understanding. In practice, the number of pixels is increased by the number of colors, i.e., four colors=four times.

Figure 20:
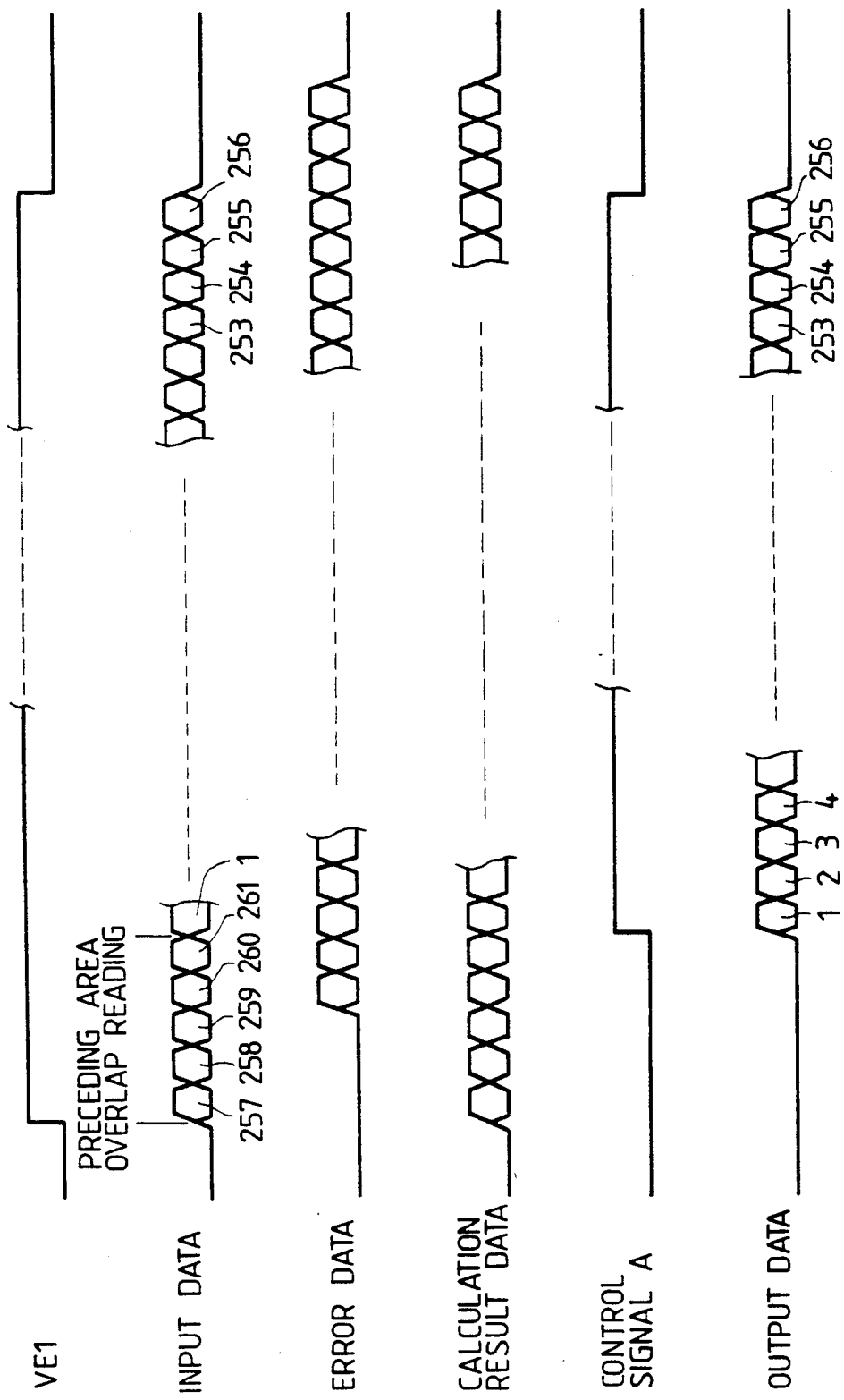
FIG. 20 is a detailed timing chart of the binary encoding processing unit.

When n overlap pixels (e.g., five pixels in FIG. 20) are read, output data which are sequentially binary-encoded from the first pixel from the comparator 332 are output by a necessary number of pixels from the (n+1)th pixel (corresponding to the first pixel of the noticed area in FIG. 20). That is, (n+256) image data are input in synchronism with a signal VE1, as shown in FIG. 20 because the 256 pixels of the noticed area and the n pixels of the previous area are overlap-read. The resultant data are binary-encoded and gated in response to a control signal A, thereby outputting necessary 256-pixel data.

As described above, the overlap portion between the previous and present areas is read and binary-encoded, and a joint portion can be eliminated.

In the above embodiment, ROM table conversion is performed in the error distributor unit 331. However, conversion may be performed by using a RAM, a multiplier, and the like.

Figure 21A:
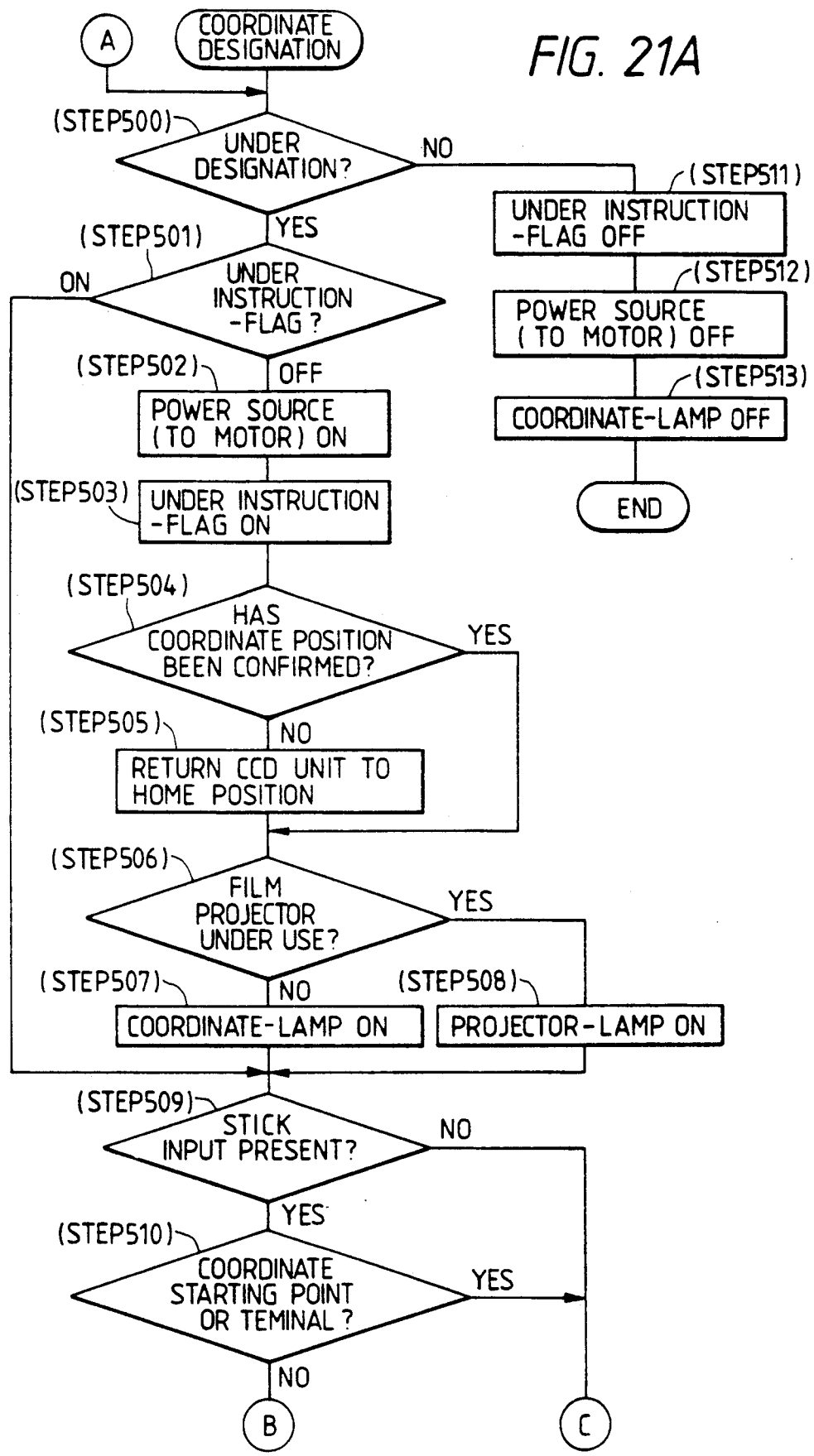
FIGS. 21A and 21B, are flow charts showing operations of coordinate designation.
Figure 21B:
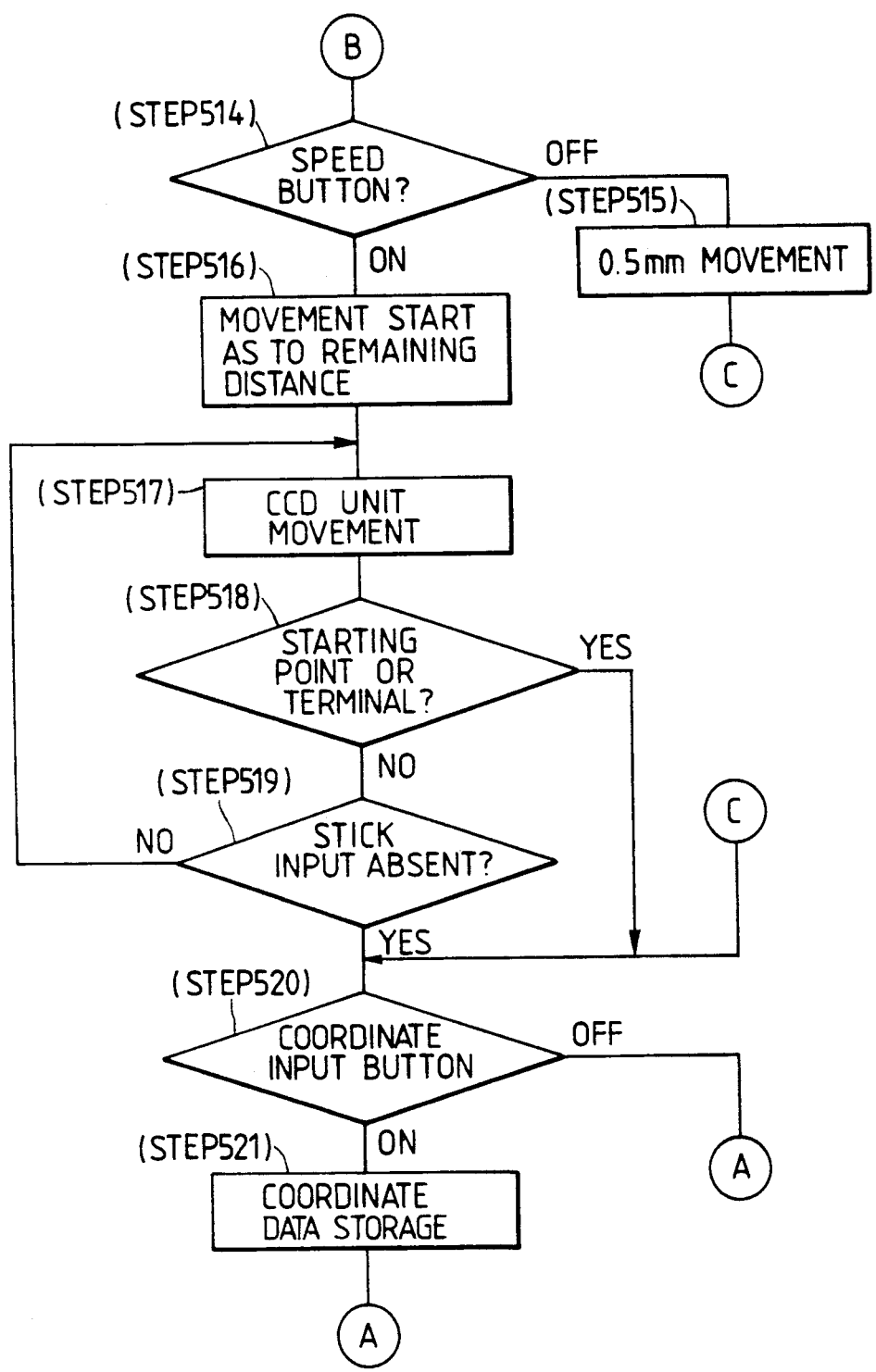

A coordinate designation operation using the stick controller 84 will be described with reference to a flow chart in FIG. 21.

If coordinate designation is being performed (STP500), i.e., under designation, the flow advances to step STP501 to determine if an under instruction-flag representing operation information is ON. If NO in step STP501, coordinate designation is started. In this case, a power source for energizing the motors 50 and 60 for moving the CCD unit 18 in the upper, lower, left, and right directions is energized (step STP502) (the power source for the motors is normally kept off in favor of energy saving), and the under instruction-flag is set (step STP503). If a coordinate position is not confirmed (step STP504), the CCD unit 18 is returned to the home position as the reference position as described above (step STP505). In this embodiment, since the stepping motor is operated in response to a phase signal output from the controller is used to move the CCD unit 18, the displacement and position of the CCD unit 18 can be detected upon counting of output pulses (steps) of the phase signal from the home position. Upon power ON, the carriage position is not detected, and therefore, the CCD unit 18, i.e., the carriage is returned to the home position.

The flow advances to step STP506 to determine whether a film projector is being used, i.e., film projector under use. If NO in step STOP506, the coordinate lamp 80 is turned on (step STP507). Otherwise, a projector lamp is turned on (step STP508).

It should be noted that a film projector is a unit mounted on the copying machine to project a 35-mm film with a light source from the lower surface of the film and to form a film image on the original table glass 17 through a lens. When the image formed on the original table glass 17 is photoelectrically converted, the same image signal as obtained by reading an original can be obtained.

The flow advances to step STP509 to determine whether an upper, lower, left, or right switch ON signal is input by the stick 85 of the controller 84. If YES in step STP509 and the CCD unit 18 is located at a stating point (right or lower input) or a terminal (left or upper input) (step STP510), no movement of the CCD unit 18 is performed since its further movement is impossible. Otherwise, the speed button 86 is checked (step STP514). If the speed button 86 is OFF, the CCD unit 18 is moved by 5 mm (step STP515). The CCD unit 18 can be moved by 63.5 μm/step. If the displacement is 0.5 mm, an 8-step phase signal is output to the motor. However, if the speed button is ON, a movable distance is calculated from the present coordinates in accordance with the input direction of the stick 85, and the step signals are sequentially output to move the CCD unit 18 (steps STP516 and STP517). The flow advances to step STP518 to determine whether the coordinate point represents the starting point or the terminal. If YES in step STP518, the operation is stopped.

If NO in step STP518, the flow advances to step STP519 to determine whether an input from the stick 85 is absent. If YES in step STP519, i.e., when the stick is not pushed in the upper, lower, left, or right direction, movement of the CCD unit 18 is stopped and the coordinate input button 87 is checked. If the coordinate input button 87 is ON, coordinate data is stored. The coordinate input from the operation unit 10 is disabled (step STP500), the under instruction-flag is reset to OFF (step STP511), and the motors 50 and 60 are deenergized (step STP512). At the same time, the coordinate lamp (the projector lamp when the projector is used) is turned off (step STP513), thereby ending the coordinate designation operation.

In the copying machine of this embodiment, the speed of the CCD unit 18 is changed by the button. However, the speed of the CCD unit 18 may be changed by an operating duration of the stick or the like.

In the image reading apparatus for reading an image and converting it into an electrical signal, the reader section also serves as the coordinate designation section, the coordinate designation section is moved by an operation designating means to read the original, and at the same time coordinate designation is performed while the operator observes the original from the reader element side. The movement operation mode can also be controlled by the operation designating means, thereby providing the apparatus which improves operability of the operator. In particular, coordinate designation can be performed without moving the original. Therefore, positional error control for the coordinates and the original can be eliminated.

Detailed operations using movement of the CCD unit 18 and coordinate designation by using the stick controller 84 will be described below.

First, an operation for inputting coordinates with the operation unit 10 to designate a partial area of an original and copy an image of the partial area will be described. The area designation key 4-3 in the operation unit 10 is depressed.

Figure 22:
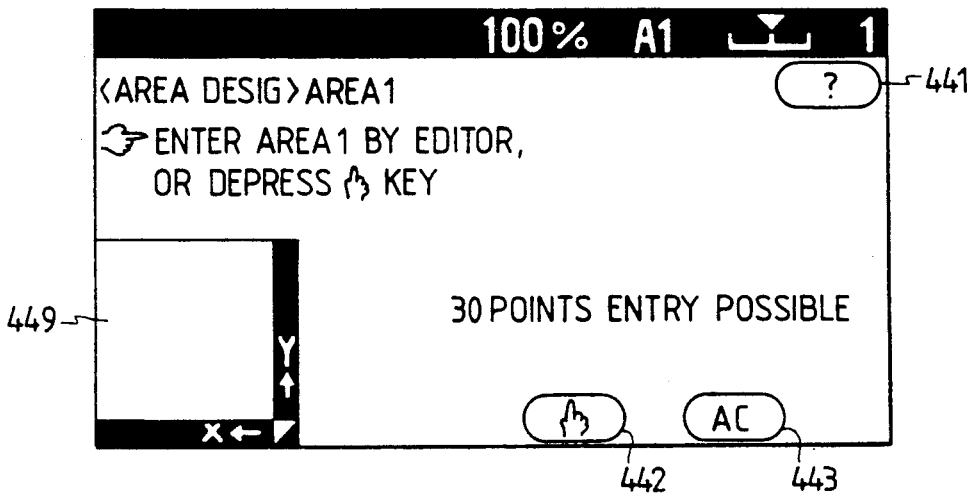
FIGS. 22, 23 and 24 are views showing display contents in area designation.

The display content of the touch panel display 7 is updated, as shown in FIG. 22, and coordinate designation with the stick controller 84 can be performed.

Upon operation of the stick controller 84, the CCD unit 18 is moved to confirm the coordinate positions with the mirrors 19 and 9. Coordinates of two diagonal points of the desired area are sequentially input upon depression of the input button 87. A display content of the touch panel display 7 is changed, as shown in FIG. 23.

Figure 24:
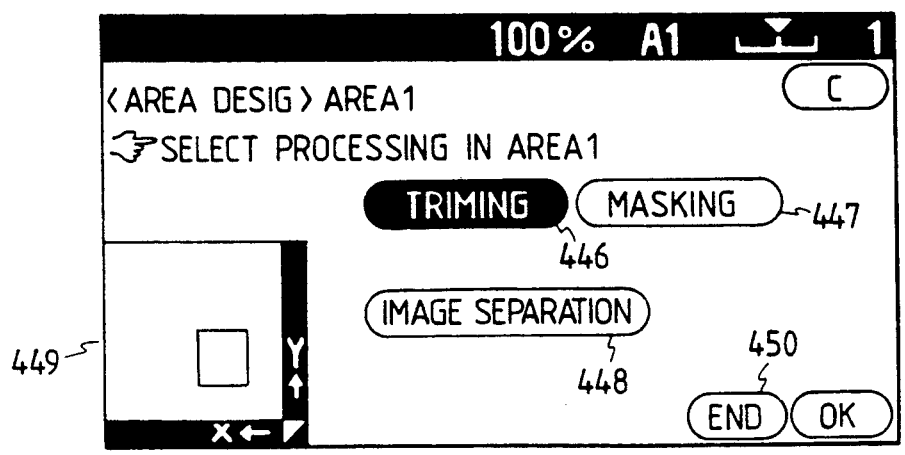

If the correct coordinates are input, the operator depresses an OK key 445, and the display content of the display 7 is changed, as shown in FIG. 24. If the operator wishes to copy only the designated area, he depresses a trimming key 446 and then an end key 450.

Figure 23:
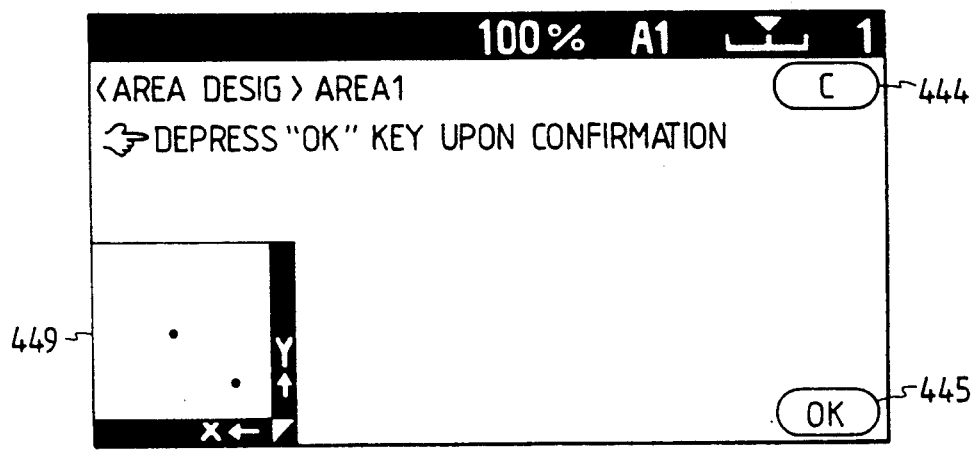

Coordinate designation with the stick controller 84 can be performed when display contents are given as shown in FIGS. 22 and 23.

A "?" key 441 in FIG. 22 is used to display a message instruction screen of coordinate designation. When a finger key 442 is depressed, a numeric value input screen is displayed. When an AC key 443 is depressed, the area designation mode is canceled. A C key 444 in FIG. 23 is used to clear coordinate input data.

A screen display area 449 in FIG. 22 roughly shows coordinate input points. A display content is changed every time coordinates are input, as shown in FIG. 23. When the OK key 445 is depressed, the input points are connected by lines to display a rectangular area.

Masking and image separation keys 447 and 448 are respectively a key for designating processing for erasing an image within the designated area and a key for designating different operations between the designated area and an area outside the designated area.

It should be noted that the number of dots of the liquid crystal display unit of the touch panel display 7 is small and its operation speed is low, so an image must be confirmed through the mirrors. However, a high-speed liquid crystal (a color liquid crystal may be used) or a CRT may be used to arrange the operation unit. In this case, the operator need not confirm the image through the mirrors because the read images are sequentially displayed on the high-speed liquid crystal display or the CRT, thereby facilitating coordinate designation.

A confirmation key may be arranged. In this case, designated points are sequentially moved upon depression of the confirmation key after coordinate designation, thereby allowing the operator to confirm the designated points.

An operation for designating an original size with the stick controller 84 and enlarging or reducing the size of the image in accordance with the size designation will be described below.

Figure 25A:
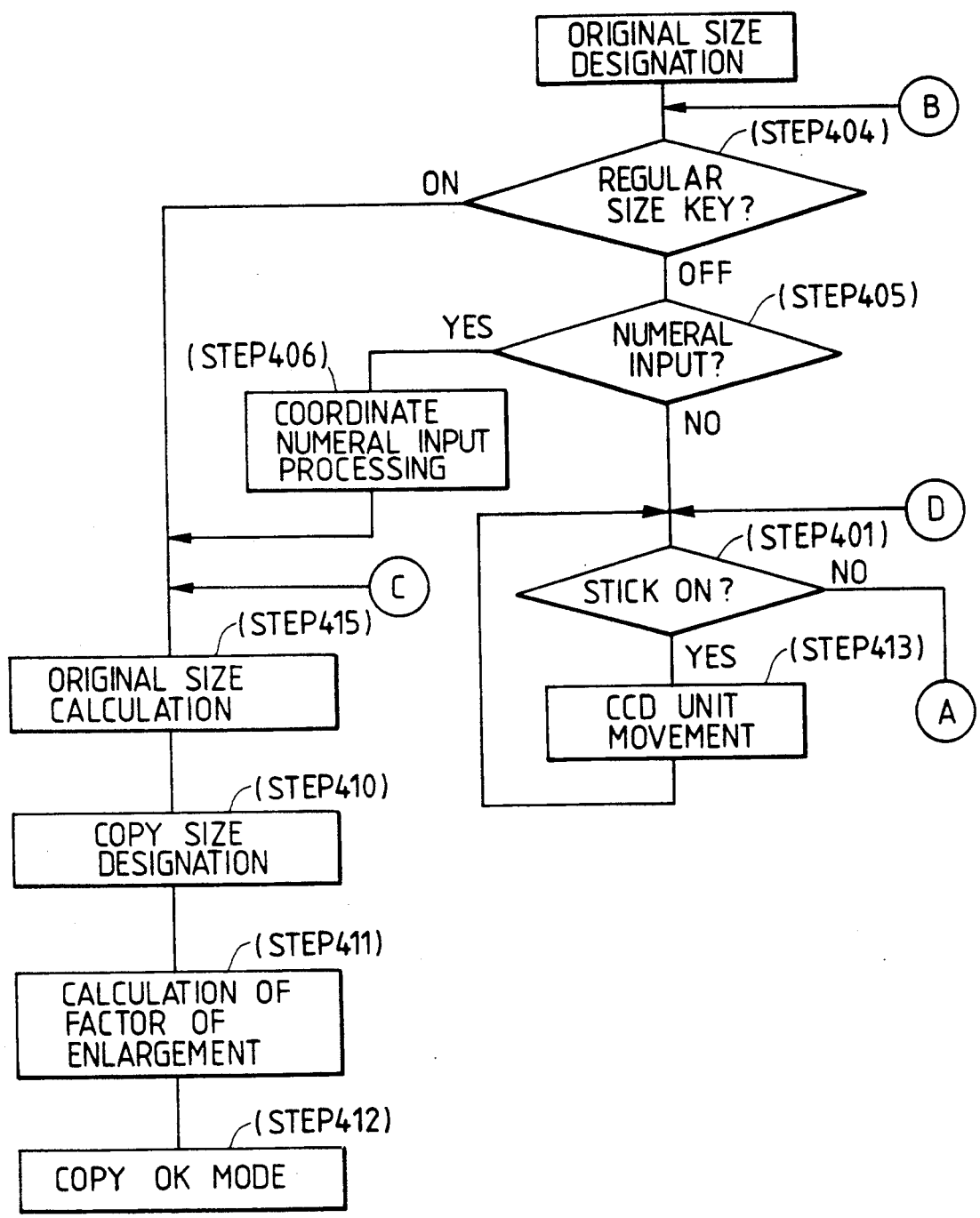
FIGS. 25A and 25B are flow charts showing operations associated with original size designation.
Figure 25B:
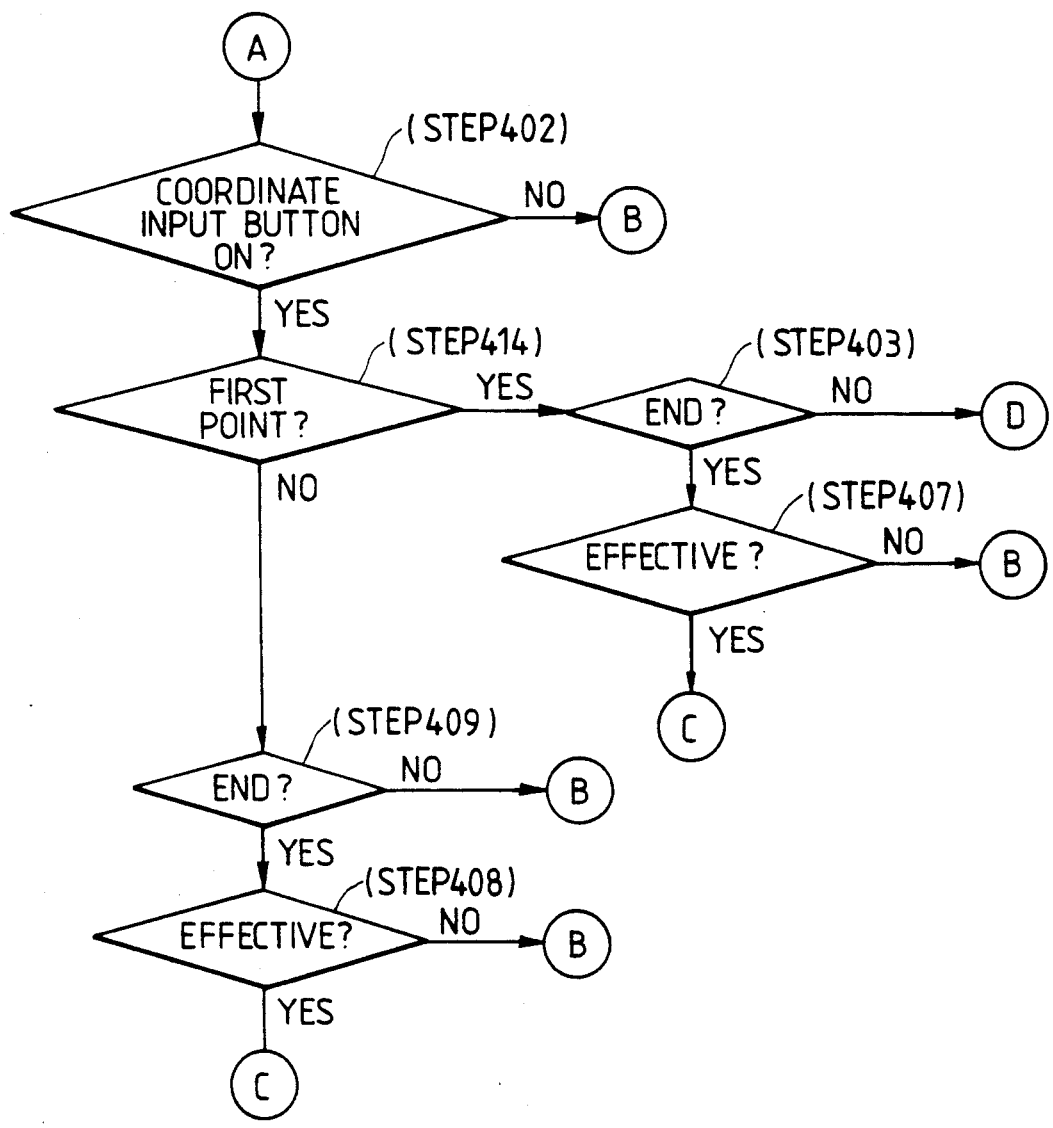

A method of designating an original size by using the coordinate input unit described above will be described with reference to flow charts in FIGS. 25(A) and 25(B).

When the original size designation key 4-4 in the operation unit 10 is depressed, the original size designation mode is set. Upon operation of the stick 85 of the stick controller 84, the CCD unit 18 can be moved to an arbitrary position.

When the stick 85 of the stick controller 84 goes on (step STP401), the CCD unit 18 is moved as described above (step STP413).

When the coordinate input button 87 is depressed (step STP402), the position of the CCD unit 18 is stored in the controller as a first point if no coordinate points are input (step STP414). The flow returns to step STP401 to input the second coordinate point (step STP403).

Figure 26A:
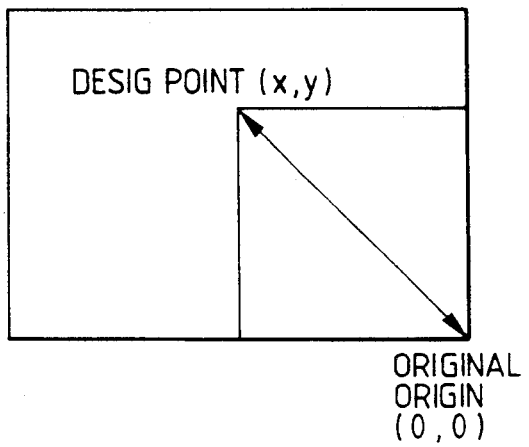
FIGS. 26A and 26B are views for explaining operations in original size designation.

When coordinate designation (original size designation) is completed, the flow advances from step STP403 to step STP415 to define a rectangle by using the origin of the original and the designated point as two diagonal points, thereby calculating an original size, as shown in FIG. 26(A).

Figure 26B:
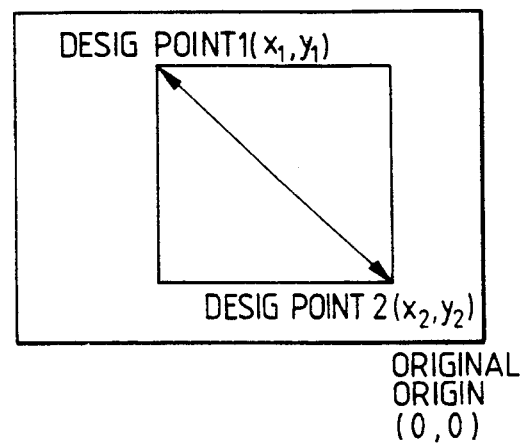

However, when the second coordinate point is designated and coordinate designation is completed, the flow advances from step STP409 to step STP415 to define a rectangle by the first and second designated points as diagonal points, thereby calculating an original size, as shown in FIG. 26(B). If input coordinate values are invalid, i.e., are not diagonal points (e.g., x-coordinates or/and y-coordinates of the two input points are the same), input points are invalid (steps STP407 and STP408). When the second point is input and then the coordinate input button 87 is depressed, a coordinate designation end is detected. In this case, the latest two input coordinate points as diagonal points are used to define a rectangle, thereby calculating an original size (step STP415).

When original size designation is completed, the flow advances to step STP410 to recognize whether a designated copy size is a regular size. After various operations such as calculation of a factor of enlargement are performed on the basis of the original size and the copy size (step STP411), a copy OK mode is set (step STP412).

Figure 27:
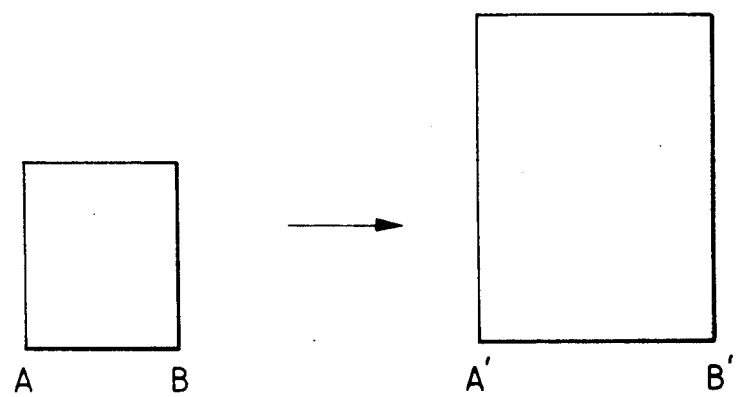
FIG. 27 is a view for explaining calculation of a factor of enlargement.
Figure 28:
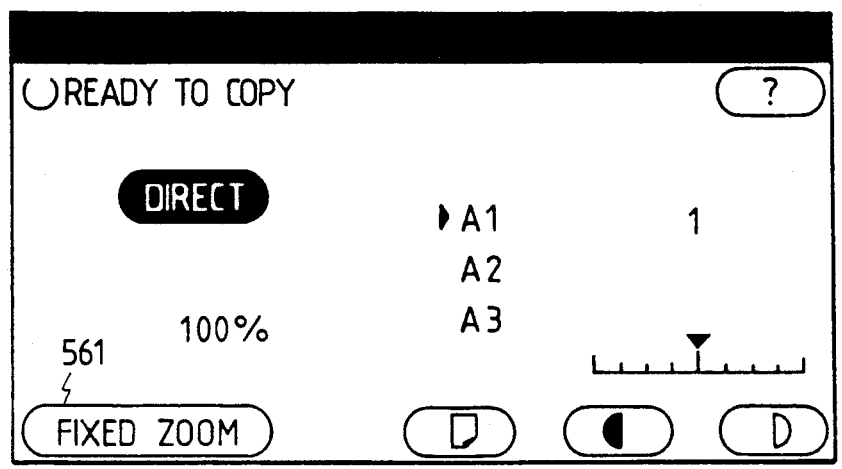
FIGS. 28 to 32 are views showing color balance monitor operations.

The factors of enlargement are calculated on the basis of short sides AB and A′B′ of the respective rectangles, as shown in FIG. 27.

The method of designating the original size by using the stick controller 84 has been described above. However, a regular size key displayed on the touch panel display 7 of the operation unit 10 may be used to select a regular size (step STP404), or numerical values may be input from the touch panel display 7 (steps STP405 and STP406).

Procedures for designating an original size at the operation unit 10 will be described with reference to FIGS. 28 to 32. When an original is enlarged or reduced and copied with another regular size. a regular size key 561 on the touch paneL display 7 of the operation unit 10 is depressed.

Figure 29:
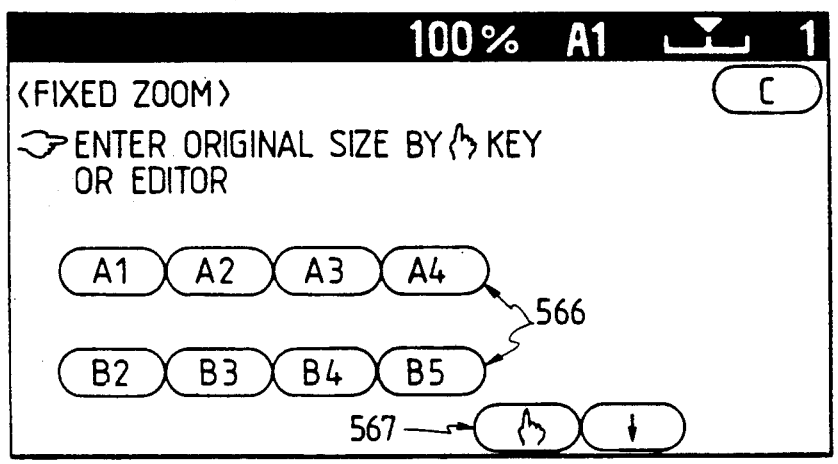

The display content of the touch panel display 7 is changed, as shown in FIG. 29. In this state, an original size can be designated with keys 566 on the touch panel display 7 or the stick controller 84.

When the original size key 4-4 is depressed, the stick controller 84 is operated to move the CCD unit 18. The operator inputs one point with respect to the origin of the original or two diagonal points while confirming the coordinate positions through the mirrors 19 and 9. The operator then depresses the coordinate input button 87 to store the designated points.

Figure 30:
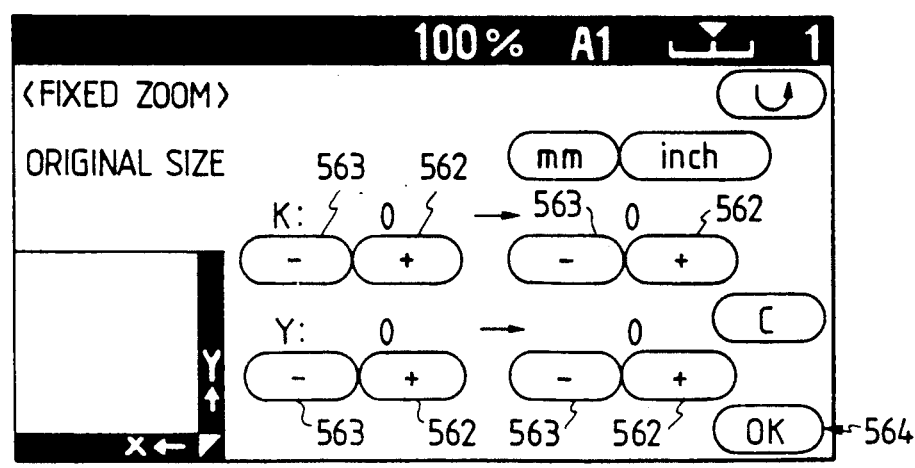

The display content of the touch panel display 7 is changed upon the first depression of the coordinate input button 87, as shown in FIG. 30. When one point is input, original origin coordinates (0,0) and input coordinates (X1,Y1) are displayed on the touch panel display 7. When two diagonal points are input, coordinates (X2,Y2) and (X3,Y3) are displayed.

Figure 31:
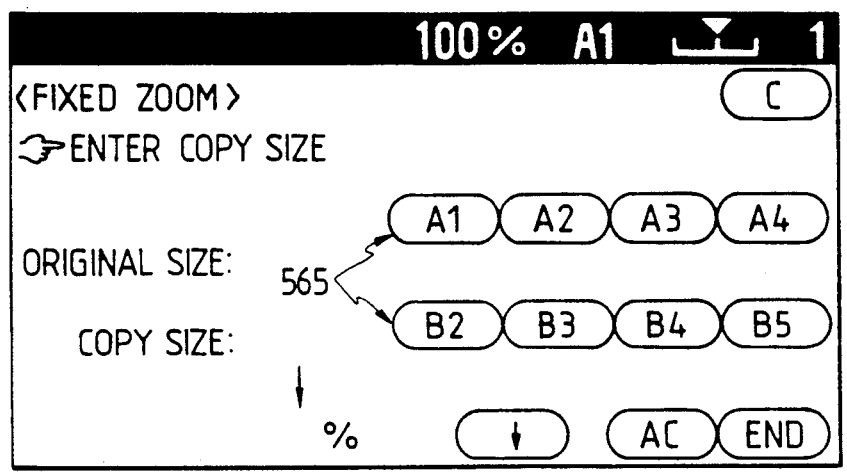
Figure 32:
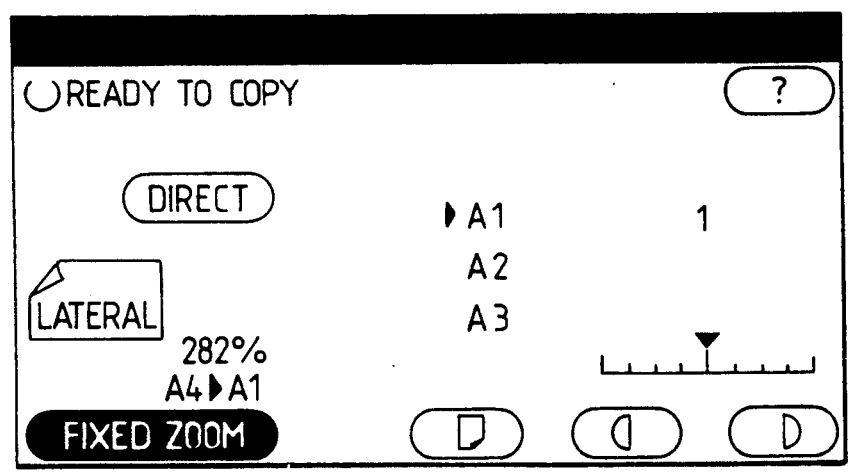

"+" and "−" keys 562 and 563 are used to correct the input coordinates. If no correction is required, an OK key 564 is depressed to change the display content of the touch panel display 7, as shown in FIG. 31. In this case, a copy size is selected with touch keys 565. When the above input operations are completed, the end key is depressed, so that the display content of the touch panel display 7 is changed, as shown in FIG. 32. That is, a copy OK state is obtained. The original size, the copy size, and the factor of enlargement are displayed on the touch panel display 7.

The original size need not be designated with the stick controller 84. For example, the original size may be designated with a regular size key 566 (FIG. 29), or designated by coordinate numerical values with the "+" or "−" key 562 and 563 in the mode of FIG. 30 upon depression of the finger key 567.

In this embodiment, the shape of the original is limited to a rectangular shape, and the number of input points is one or two. However, a means for processing coordinate information may be arranged to input an original shape except for the rectangular shape, thereby achieving more complex enlargement/reduction processing.

The coordinate input means may be used to input shape information such as a figure drawn on an original in addition to designation of the original size. In this case, only a noticed figure may be enlarged or reduced into an arbitrary size within the original.

According to this embodiment as described above, the operation control unit having the optical mirrors is arranged in the image reading apparatus to simultaneously perform image reading and coordinate designation. By utilizing the above arrangement, the original size can be designated by inputting only one or two coordinate points, thereby facilitating the operation and increasing the operation speed.

In particular, as the operator can designate the original size while confirming the state of the original, more accurate information can be input.

An operation for causing the stick controller 84 to move the CCD unit 18 and performing color balance monitoring for monitoring an original color will be described below.

Figure 33A:
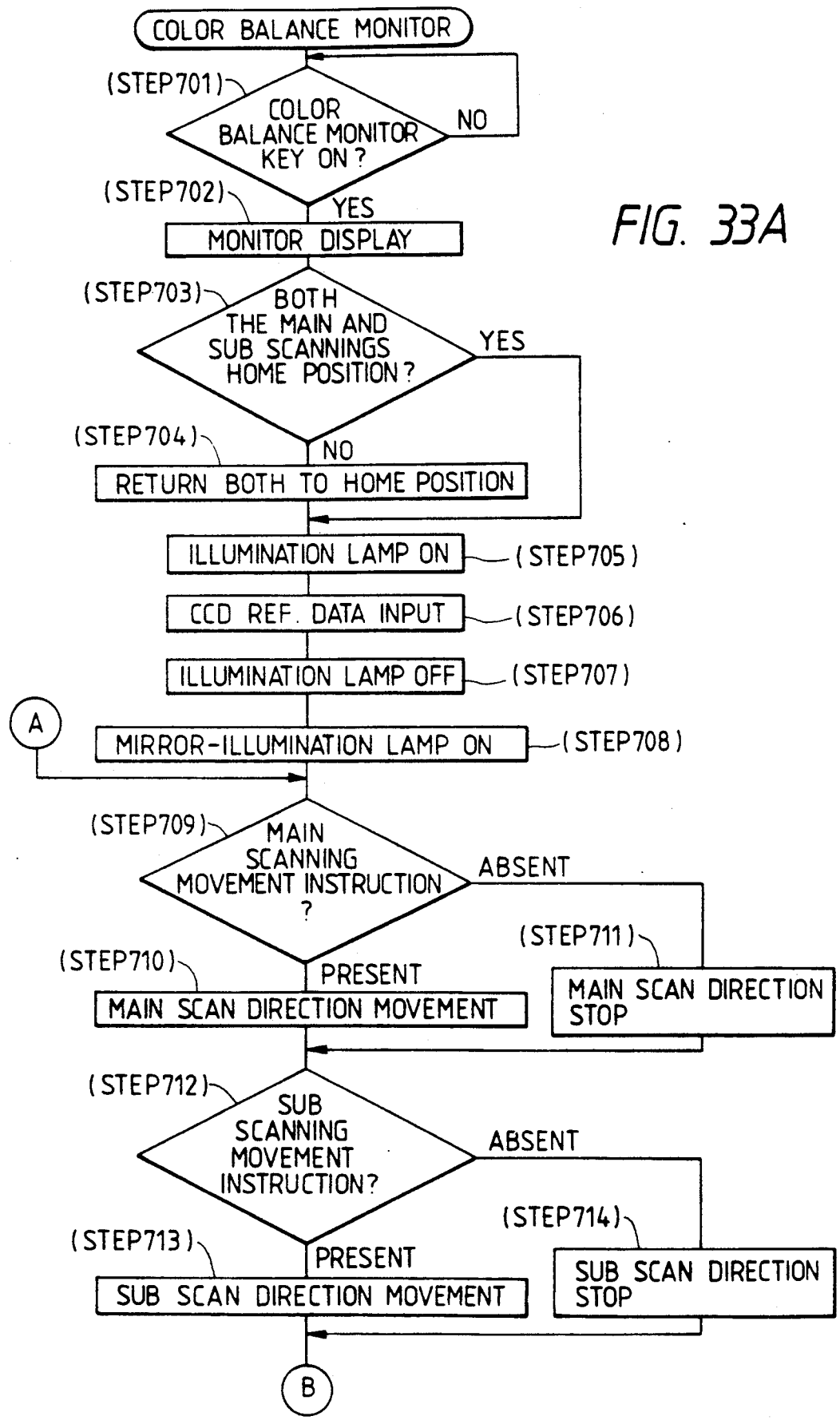
FIGS. 33A and 33B, are flow charts showing a color balance monitor operation.
Figure 33B:
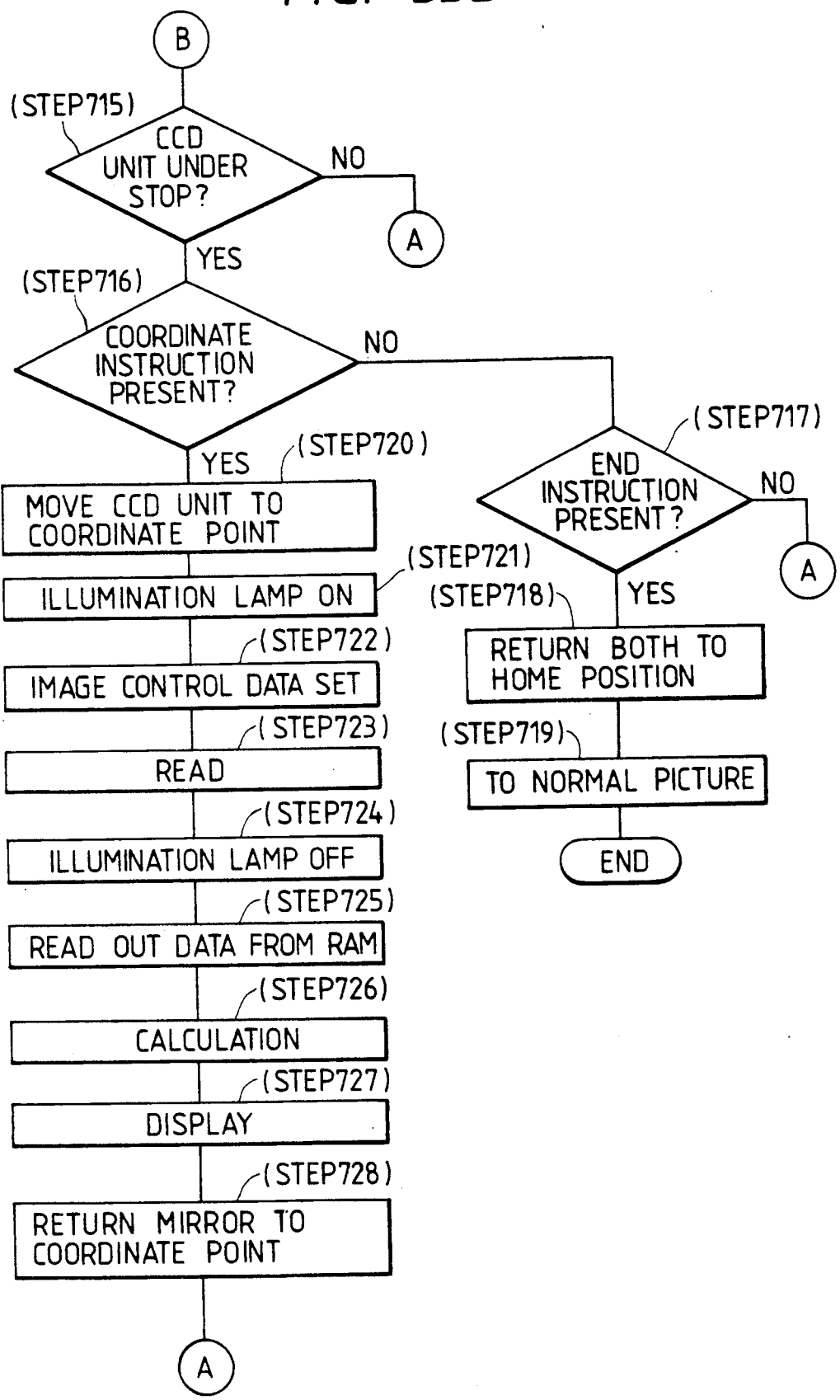

FIG. 33 is a flow chart for explaining operations of the control units 102 and 111 during a color balance monitor operation.

When the color balance monitor key 4-1 in the operation unit 10 is depressed, a display content shown in FIG. 4 is displayed on the touch panel display 7 (steps STP701 and STP702). The flow advances to step STP703 to determine whether the CCD unit 18 is located at the main and sub scanning home positions shown in FIG. 8. If NO in step STP703, the motors are operated to return the CCD unit 18 and the rails 54 to their home positions (step STP704). In this embodiment, a reference white board (the correction area 68) is provided at the home position. An illumination unit arranged below the CCD unit 18 is turned on once to read reference data (e.g., shading data) of the CCD 16 and is then turned off (steps STP705, STP706, and STP707). In this embodiment, the illumination lamp 14 in the illumination unit comprises a halogen lamp and is turned on/off upon every operation so as to prolong the service life of the lamp. The mirror illumination lamp 80 is then turned on (step STP708).

If a main scanning movement instruction is output from the stick controller 84, the motor 50 is operated; and if the instruction is disabled, the motor 50 is stopped (steps STP709, STP710, and STP711). Inputs from the stick controller 84 in the sub scanning direction are monitored. If an operation instruction is enabled, the motor is operated; and when the instruction is disabled, the motor is stopped (steps STP712, STP713, and STP714).

In this embodiment, since an original which can be placed on the original table glass 17 is as large as the A1 size, the motor speed is changed in several steps during the input duration of the button or the stick controller 84, so that the operator can easily designate the coordinates.

The flow advances to step STP715 to check whether the CCD unit 18 is stopped. If YES in step STP715, the flow advances to step STP716 to check whether the coordinate designation button 87 of the stick controller 84 is depressed. If NO in step STP716, whether the end key of the operation unit 10 is depressed is checked in step STP717. If NO in step STP717, the flow returns to the movement instruction block. If YES in step STP717, the CCD unit 18 is returned to the main and sub scanning home positions, and the mirror illumination lamp is turned off (step STP718). The display content of the touch panel display 7 of the operation unit 10 returns to the normal display content, and the flow is ended (step STP719). If coordinate designation is present, the CCD unit 18 is moved to the coordinate point (step STP720). In this embodiment, as shown in FIGS. 5 and 8, since a predetermined distance (50 mm in this embodiment) is present between the coordinate designation points of the mirror 19 and the arrow 81, the CCD unit 18 is moved by the predetermined distance. The lamp 14 is then turned on, and image control data (coefficients for converting R, G, and B components into Y, M, C, and K components and gate information for storing the image in a RAM) are set (step STP722), and image reading is performed (step STP723). When a signal instruction is supplied to an image control circuit, photoelectric conversion is automatically performed, and the image signal charge is stored in the RAM.

The illumination lamp is turned off (step STP124). data is read out from the buffer memory 110 (step STP725), percents of the color components are calculated (step STP726), and a bar graph and the calculated percents are displayed on the touch panel display 7 (step STP727), as shown in FIG. 4. The mirror 19 is returned to the coordinate position (step STP728), and a movement instruction check is then initiated again.

In this embodiment, only one coordinate point of color information is displayed. However, data of an area having a given size may be read, and their average value may be displayed.

In this embodiment, the coordinate point is designated by the CCD unit 18 under the control of the stick controller 84 from the lower surface of the original. However, if a coordinate point is designated with another coordinate designation unit such as the digitizer 114, the present invention is also applicable to an electrophotographic color copying machine.

When the present invention is applied to a monochromatic copying machine, the density may be displayed in place of the color information. In this embodiment, the operator designates coordinates while observing the original state through the mirror 19 offset from the CCD unit 18 by the predetermined distance. This offset must be compensated. However, when a beam splitting unit such as a beam splitter is arranged between the CCD unit 18 and the original, a movement error and a moving time during image reading can be minimized.

The present invention is further applicable to an arrangement for sequentially reading and displaying the read data while the CCD unit 18 is being moved, and easily applicable to the RGB system in place of the YMCK system.

In this embodiment, a RAM may be used to store the read pixel data. The memory need only have a small capacity for storing 256-pixel data. Therefore, an operation control RAM used by the CPU and a shading data storage RAM may also serve as the read pixel data storage RAM.

In a color copying machine having a function for registering a specific color in a memory, the registration content can be displayed with color balance. Therefore, an effect obtained by using this color and the registration contents can be easily checked, and utilization of the registered color can be facilitated.

As has been described above, according to this embodiment, the function for reading color information of a specific portion of the original and displaying the read color information on the display is assigned to the color copying machine. Therefore, appropriate copying conditions can be set within a short period of time without repetitions by adjusting the function such as conversion of other colors and the color balance.

The operator who utilizes the above function can be accustomed to color balance and can easily obtain an excellent color image.

The present invention is not limited to the color copying machine exemplified in the above embodiment but can be applicable to various apparatuses.

As described above, color information at the designated position can be easily obtained with the above arrangement.

In the above embodiment, the copying machine is exemplified. However, the present invention can be equally applied to various other apparatuses.

The present invention has been described with reference to the preferred embodiment, but is not limited thereto. Various changes and modifications may be made within the scope of the appended claims.

What is claimed is:

1. An image processing apparatus comprising:
   reader means for reading an image and generating image data corresponding thereto;
   first moving means for moving a reading position of said reader means in a main scanning direction;
   second moving means for moving the reading position of said reader means in a sub-scanning direction;
   setting means for setting a desired operation mode;
   designating means for designating movement of the reading position of said reader means to a desired position; and
   control means for controlling said first and second moving means to cause, if a first mode has been set by said setting means, the reading position of said reader means to be moved a plurality of times in the main scanning direction, and also to be moved in the sub-scanning direction every time the reading position is moved in the main scanning direction so that said reader means can read the image, and to cause, if a second mode has been set by said setting means, the reading position of said reader means to be moved to the desired position in accordance with the designation of said designating means so that said reader means can read the image at the desired position, said control means further controlling said first and second moving means, in the second mode, to cause said reader means to be moved at a plurality of moving speeds in accordance with the designation of said designating means.

2. An apparatus according to claim 1, wherein said designating means designates a moving direction of the reading position of said reader means.

3. An apparatus according to claim 1, wherein said designating means designates a moving speed of the reading position of said reader means.

4. An apparatus according to claim 1, wherein said reader means comprises a linear image sensor for reading the image line by line.

5. An apparatus according to claim 1, wherein, in the first mode, an image is read by said reader means, and wherein in the second mode a coordinate is set by a position of said reader means.

6. An apparatus according to claim 5, further comprising recognizing means for recognizing the coordinate of the position of said reader means.

7. An apparatus according to claim 5, further comprising process means for processing the image data generated by said reader means, said process means processing the image data generated by said reader means in the first mode in accordance with a coordinate set in the second mode.

8. An apparatus according to claim 7, wherein said process means performs variable magnification processing on the image data.

9. An image processing apparatus comprising:
   reader means for reading an image and generating image data accordance therewith;
   first moving means for moving a reading position of said reader means in a main scanning direction;
   second moving means for moving the reading position of said reader means in a sub-scanning direction;
   setting means for setting a desired operation mode;
   recognizing means for recognizing a coordinate of the reading position of said reader means;
   designating means for designating movement of the reading position of said reader means to a desired position;

control means for controlling said first and second moving means to cause, if a first mode has been set by said setting means, the reading position of said reader means to be moved a plurality of times in the main scanning direction, and also to be moved in the sub-scanning direction every time the reading position is moved in the main scanning direction so that said reader means can read the image to be and to cause, if a second mode has been set by said setting means, the reading position of said reader means to be moved to the desired position in accordance with the designation of said designating means, so that said recognizing means can recognize the coordinate of the reading position of said reader means; and discriminating means for discriminating one of (1) a size and (2) a position of an image read by said reader means in the first mode based on the coordinate recognized by said recognizing means in the second mode.

10. An apparatus according to claim 9, wherein said designating means designates a moving direction of the reading position of said reader means.

11. An apparatus according to claim 9, wherein said reader means comprises a linear image sensor for reading the image line by line.

12. An apparatus according to claim 9, further comprising process means for processing the image data generated by said reader means, said process means processing the image data in accordance with the size or the position discriminated by said discriminating means.

13. An apparatus according to claim 12, wherein said process means performs variable magnification processing on the image data.

14. An apparatus according to claim 12, wherein said process means comprises recording means for recording an image on the basis of the image data.

15. An image processing apparatus comprising:
reader means for reading an image and generating image data corresponding thereto;
first moving means for moving a reading position of said reader means in a main scanning direction;
second moving means for moving the reading position of said reader means in a sub-scanning direction;
setting means for setting a desired operation mode;
designating means for designating movement of the reading position of said reader means to a desired position;
control means for controlling said first and second moving means to cause, if a first mode has been set by said setting means, the reading position of said reader means to be moved a plurality of times in the main scanning direction, and also to be moved in the sub-scanning direction every time the reading position is moved in the main scanning direction, so that said reader means can read all over the area of the image, and to cause, if a second mode has been set by said setting means, the reading position of said reader means to be moved to the desired position in accordance with the designation of said designating means, so that said reader means can read the image at the desired position; and
recognizing means for recognizing color balance information of a color image of the image at the desired position based on image data generated by said reader means in the second mode.

16. An apparatus according to claim 15, wherein said designating means designates a moving direction of the reading position of said reader means.

17. An apparatus according to claim 15, further comprising display means for displaying the color information recognized by said recognizing means.

18. An apparatus according to claim 15, further comprising process means for processing the image data generated by said reader means.

19. An apparatus according to claim 15, wherein said recognizing means recognizes image color components.

20. An apparatus according to claim 15, wherein said reader means comprises a linear image sensor for reading the image line by line.

21. An apparatus according to claim 15, wherein said reader means reads a color image and generates the image data including color component signals.

22. An image processing apparatus comprising:
reader means for reading an image and generating image data corresponding thereto;
first moving means for moving a reading position of said reader means in a main scanning direction;
second moving means for moving the reading position of said reader means in a sub-scanning direction;
setting means for setting a desired operation mode;
designating means for designating movement of the reading position of said reader means to a desired position;
control means for controlling said first and second moving means to cause, if a first mode has been set by said setting means, the reading position of said reader means to be moved a plurality of times in the main scanning direction, and also to be moved in the sub-scanning direction every time the reading position is moved in the main scanning direction, so that said reader means can read all over the area of the image, and to cause, if a second mode has been set by said setting means, the reading position of said reader means to be moved to the desired position in accordance with the designation of said designating means, so that said reader means can read the image at the desired position; and
recognizing means for recognizing an image density of a monochromatic image, of the image at the desired position based on image data generated by said reader means in the second mode.

23. An apparatus according to claim 22, wherein said designating means designates a moving direction of the reading position of said reader means.

24. An apparatus according to claim 22, further comprising display means for displaying the image density recognized by said recognizing means.

25. An apparatus according to claim 22, further comprising process means for processing the image data generated by said reader means.

26. An apparatus according to claim 22, wherein said reader means comprises a linear image sensor for reading the image line by line.

* * * * *

UNITED STATES PATENT AND TRADEMARK OFFICE
CERTIFICATE OF CORRECTION

PATENT NO. : 5,181,104
DATED : January 19, 1993
INVENTOR(S) : SUGISHIMA ET AL.

It is certified that error appears in the above-identified patent and that said Letters Patent is hereby corrected as shown below:

Title Page:
[56] REFERENCES CITED
FOREIGN PATENT DOCUMENTS
    "59117858 7/1984 Japan" should read
--59-117858 7/1984 Japan--.

COLUMN 16

Line 35, "stating" should read --starting--.

COLUMN 19

Line 1, "paneL" should read --panel--.

COLUMN 23

Line 8, "image to be" should read --image,--.
    Line 17, "image" should read --image to be--.

Signed and Sealed this

Twenty-first Day of December, 1993

Attest:

BRUCE LEHMAN

*Attesting Officer*  *Commissioner of Patents and Trademarks*